(12) United States Patent
Gupta et al.

(10) Patent No.: US 12,368,923 B2
(45) Date of Patent: *Jul. 22, 2025

(54) SYSTEMS AND METHODS FOR DETECTING A NUMBER OF VIEWERS

(71) Applicant: Adeia Guides Inc., San Jose, CA (US)

(72) Inventors: Vikram Makam Gupta, Karnataka (IN); Reda Harb, Tampa, FL (US); Vishwas Sharadanagar Panchaksharaiah, Tiptur (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,172

(22) Filed: Apr. 18, 2024

(65) Prior Publication Data
US 2025/0016408 A1 Jan. 9, 2025

Related U.S. Application Data

(63) Continuation of application No. 17/391,246, filed on Aug. 2, 2021, now Pat. No. 11,991,413.

(51) Int. Cl.
H04N 21/442 (2011.01)
(52) U.S. Cl.
CPC .............. H04N 21/44204 (2013.01)
(58) Field of Classification Search
CPC ....... H04N 21/44204; H04N 21/25891; H04N 21/4532; H04N 21/4826; H04N 21/44218
USPC .......................................... 725/14
See application file for complete search history.

(56) References Cited

U.S. PATENT DOCUMENTS

| | | | |
|---|---|---|---|
| 6,239,794 B1 | 5/2001 | Yuen et al. |
| 6,564,378 B1 | 5/2003 | Satterfield et al. |
| 11,991,413 B2 | 5/2024 | Gupta et al. |
| 2006/0062429 A1 | 3/2006 | Ramaswamy et al. |
| 2009/0055862 A1 | 2/2009 | Knoller et al. |
| 2009/0298514 A1 | 12/2009 | Ullah |
| 2011/0069940 A1 | 3/2011 | Shimy et al. |
| 2013/0173765 A1 | 7/2013 | Korbecki |
| 2014/0259034 A1 | 9/2014 | Terrazas |
| 2015/0334457 A1 | 11/2015 | Chandel et al. |
| 2023/0032959 A1 | 2/2023 | Gupta et al. |

FOREIGN PATENT DOCUMENTS

WO 2011037761 A1 3/2011

Primary Examiner — Adil Ocak
(74) Attorney, Agent, or Firm — Haley Guiliano LLP

(57) ABSTRACT

Systems and methods for detecting a number of viewers of a media device are disclosed. The methods comprise generating for display on the media device a media asset, initiating a first scan while displaying the media asset for nearby user devices within a detectable range, determining a number of nearby user devices, determining a direction and distance from the media device to each of the user devices, and determining the number of viewers of the media device currently consuming the media asset, based on the distance and direction of the user devices.

20 Claims, 16 Drawing Sheets

```xml
0  <?xml version="1.0" encoding="UTF-8"?>
1  <MPD xmlns:xsi="http://www.w3.org/2001/XMLSchema-instance" xmlns="urn:mpeg:dash:schema:mpd:2011 DASH-MPD.xsd
2  <BaseURL>https://video.platform.com/v1</BaseURL>
3  <Period>
4  <!-- English Audio --> <SCAN_TAG="0">
5  <AdaptationSet mimeType="audio/mp4" codecs="mp4a.40.5" lang="en" subsegmentAlignment="true" subsegmentStartsWithSAP="1">
6  <Representation id="0" bandwidth="64000">
7  <URL>Joelsmixtape_AAC48K_064.mp4.dash</BaseURL>
8  </Representation>
9  </AdaptationSet>
10 <!-- Video --> <SCAN_TAG="1">
11 <AdaptationSet mimeType="video/mp4" codecs="avc1.42401E" subsegmentAlignment="true" subsegmentStartsWithSAP="1">
12 <Representation id="1" bandwidth="1000000" width="2160" height="1440">
13 <URL>Joelsmixtape_H264BPL30_0100.264.dash</BaseURL>
14 </Representation>
15 <Representation id="2" bandwidth="2000000" width="3840" height="2160">
16 <URL>Joelsmixtape_H264BPL30_0200.264.dash</BaseURL>
17 </Representation>
18 </AdaptationSet>
19 </Period>
20 </MPD>
```

FIG. 13

```
1400
    1 | Home 1: {
    2 |   "numberOfDevicesInVicinity":"4",
    3 |   "programId":"123",
    4 |   "tunedFrom":"0850150621" // time in GMT
    5 | }        ⎫
             ⎬ 1410
    6 | Home 2: {
    7 |   "numberOfDevicesInVicinity":"1",
    8 |   "programId":"123",
    9 |   "tunedFrom":" 0850150621 " // time in GMT
   10 | }        ⎫
             ⎬ 1420
   11 | Home 3: {
   12 |   "numberOfDevicesInVicinity":"2",
   13 |   "programId":"783",
   14 |   "tunedFrom":" 0850150621 " // time in GMT
   15 | }        ⎫
             ⎬ 1430
```

FIG. 14

SYSTEMS AND METHODS FOR DETECTING A NUMBER OF VIEWERS

CROSS-REFERENCE TO RELATED APPLICATION

This application is a continuation of U.S. patent application Ser. No. 17/391,246, filed Aug. 2, 2021, which is hereby incorporated by reference herein in its entirety.

BACKGROUND

The present disclosure relates to interactive media applications, and more particularly, to systems and methods for detecting the number of viewers of media devices at any given moment.

SUMMARY

Determining the number of viewers of a user device at each home for any particular program, advertisement, or media content is useful for many reasons including, for example, analytics, advertisement targeting, and the like. Currently, TV set-top boxes, streaming devices, and media systems can determine the channel or media content currently being viewed for a home, but the number of viewers watching the media content is not readily obtainable. Traditionally, determining the number of viewers in each home requires the use of a survey, either in person or electronically, to determine the number of residents. However, this is problematic, as some viewers may not take the survey, viewers may feel the information is private and be reluctant to provide it, and the data collected may not reflect how many of the residents are watching the TV at any given time, for example. Such survey-based information is referred to as static information and is not reflective of the dynamic ways in which users consume content on, for example, a TV. In addition, there is no way of knowing if, during a major sporting event such as the Superbowl or the Wimbledon Tennis Championship, additional guests are also watching the content.

Most individuals carry a smart device on their person throughout the day, such as a smartphone or a smart watch. These devices often have one or more wireless communication capabilities such as Bluetooth, Wi-Fi, ZigBee, or the like, which permit the transfer of information between two or more devices with no physical connection. In particular, Bluetooth Low Energy (Bluetooth LE) is a wireless personal area network technology, aimed at health care, fitness, beacons, and security, that provides low power consumption communication over a range up to 10s of meters. Bluetooth LE has been a part of the Bluetooth 4.0 standard since 2009 and is therefore now native to the majority of smart devices, including smartphones, smart watches, laptops, tablets, PCs, TV set-top boxes, and streaming devices.

In view of the foregoing, it would be desirable to provide systems and methods for allowing viewers to be detected and identified by a media device automatically. In particular, it would be desirable to provide a system that scans for the wireless signal of viewers' devices and determines, based on distance and direction, how many viewers are watching media content being displayed on a nearby TV or display. It may also be desirable to use Bluetooth LE technology in current set-top boxes, streaming devices, and media systems to scan for devices within the vicinity and determine the number of viewers. It may also be desirable to associate each viewer and their devices with a user profile to account for a single user having many devices, such as a smart watch and a smartphone.

In a first approach, there is provided a method for detecting a number of viewers of a media device, the method comprising generating for display on the media device a media asset; initiating a first scan, while displaying the media asset, for nearby user devices within a detectable range; determining a number of nearby user devices; determining a direction and distance from the media device to each of the user devices; and determining, based on the distance and direction of the user devices, the number of viewers of the media device currently consuming the media asset.

In some examples, the method further comprises generating for display on the media device a second media asset, initiating a second scan while displaying the second media asset, and comparing first scan data and second scan data to determine a change in the number of viewers and/or determine if any of the detected user devices are non-viewer devices or static devices.

In some examples, the method further comprises receiving, from each user device, an indication of identity; assigning the indication of identity for each of the user devices to a viewer profile; assigning the indication of identity for each non-viewer device or static device to a non-viewer profile.

In some examples, the method further comprises determining, based on the direction and distance, one or more user devices are associated with the same user, and assigning the indication of identity of the devices associated with the same user to the corresponding viewer profile.

In some examples, the method further comprises assigning the consumed media asset to the viewer profile; and recommending, based on at least one viewer profile, a third media asset to be consumed.

In some examples, the recommending further comprises determining, based on first and second scan data, the presence of one or more viewers.

In some examples, the method further comprises determining a common interest between two or more viewers, based on previously consumed media content, wherein the common interest is at least one of a genre, series history, cast members, favorite actors, most viewed media content, most-watched media content, unwatched episodes of a series, or common viewing history, and selecting the third media asset to be consumed based on the common interest.

In some examples, the scan is initiated in response to a trigger event. In some examples, the trigger event is at least one of an instruction to initiate the scan; a scheduled time to initiate the scan, a request for content by one of viewers; a tag in a manifest of a media content item being consumed on the media device, or the expiration of a timer, wherein the timer was initiated in response to a first scan ending.

In some examples, the method further comprises detecting Bluetooth advertising packets of the user device. In some examples, the detectable range is based on at least one of a signal comprising an indication of size of a display communicatively coupled with the media device, a user input, or determining the average distance from the media device to one or more user devices based on a received signal strength indication of the scanning signal at the user device.

In some examples, determining the direction and distance is based on an angle of arrival of a scanning signal at each of the user devices, an angle of departure of the scanning signal at the media device, and a received signal strength indication of the scanning signal at the user device.

In a second approach, there is provided a media device, comprising a control module, a transceiver module, and a network module, configured to generate for display on the media device a media asset; initiate a first scan, while displaying the media asset, for nearby user devices within a detectable range; determine a number of nearby user devices; determine a direction and distance from the media device to each of the user devices; and determine, based on the distance and direction of the user devices, the number of viewers of the media device currently consuming the media asset.

In another approach, there is provided a system for detecting a number of viewers of a media device, the system comprising: means for generating for display on the media device a media asset; means for initiating a first scan, while displaying the media asset, for nearby user devices within a detectable range; means for determining a number of nearby user devices; means for determining a direction and distance from the media device to each of the user devices; and means for determining, based on the distance and direction of the user devices, the number of viewers of the media device currently consuming the media asset.

In another approach, there is provided a non-transitory computer-readable medium having instructions encoded thereon for carrying out a method, the method comprising generating for display on the media device a media asset; initiating a first scan, while displaying the media asset, for nearby user devices within a detectable range; determining a number of nearby user devices; determining a direction and distance from the media device to each of the user devices; and determining, based on the distance and direction of the user devices, the number of viewers of the media device currently consuming the media asset.

Advantages of the present disclosure will be apparent from the following detailed description. However, by way of summary, the present disclosure allows for greater granularity in determining the number of viewers of a TV, display, media content, or advertisement; greater sensing of users within a range; smart detection of users' devices; more efficient ways of detecting viewers; not compromising the privacy of the user; and greater targeting for advertisements.

BRIEF DESCRIPTION OF THE DRAWINGS

The above and other objects and advantages of the disclosures will be apparent upon consideration of the following detailed description, taken in conjunction with the accompanying drawings, in which:

FIG. 13 illustrates exemplary pseudo-code for an adaptive bitrate manifest, in accordance with some examples of the disclosure;

FIG. 14 illustrates exemplary pseudo-code for result data of a scan to determine a number of viewers of a media device, in accordance with some embodiments of the disclosure;

DETAILED DESCRIPTION

Figure 1:
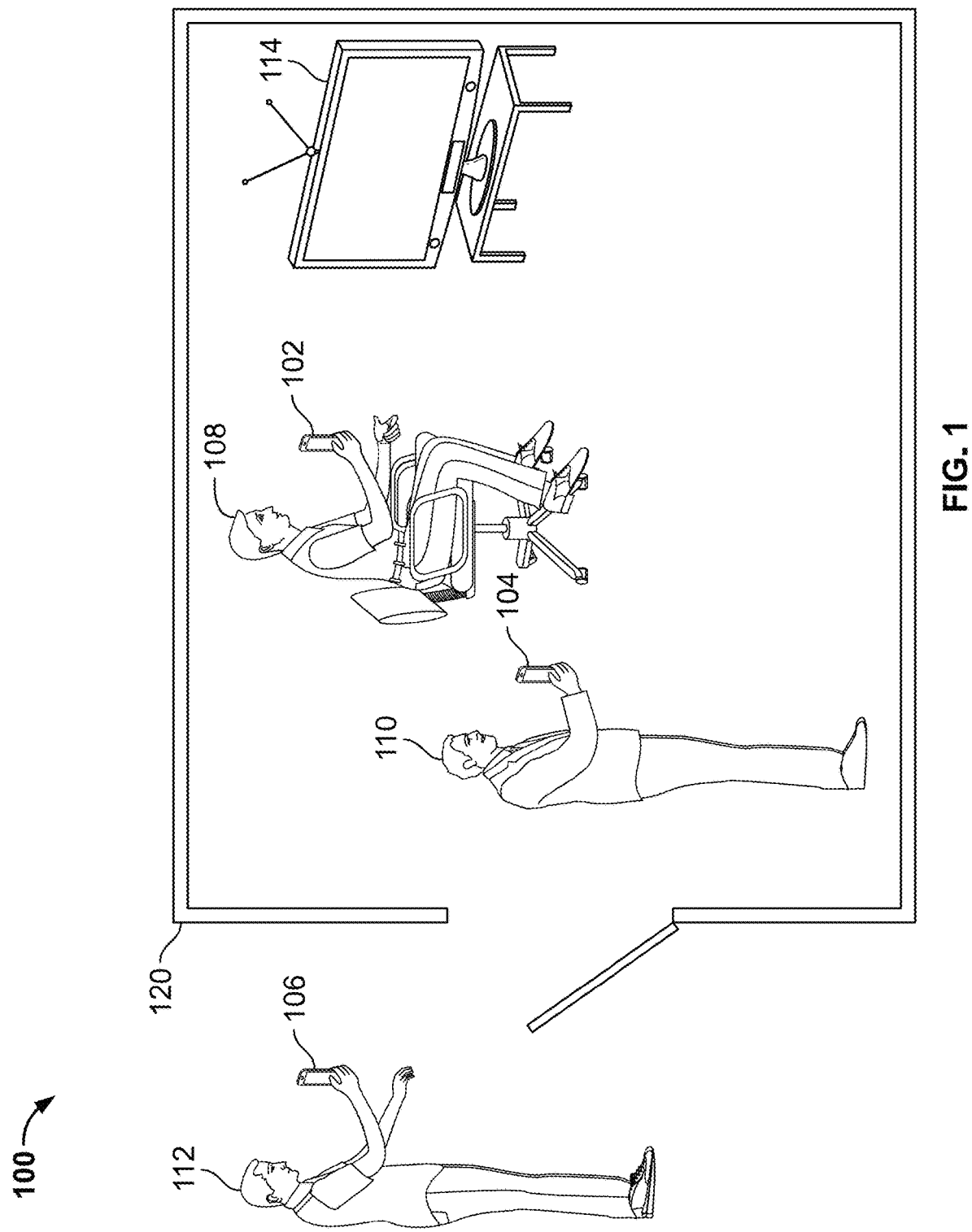
FIG. 1 illustrates a plurality of users, their devices and a media device, in accordance with some examples of the disclosure.

Methods and systems are provided herein for detecting a number of users within a range of a scanning device.

As described above, determining the number of viewers of, for example, a TV set-top box for any particular program is useful for centralized networks, both multicast and unicast providers alike, for analytics, targeting advertisements, revenue generation, and forecast, business to business sales and partnerships, as well as user interaction and feedback. For example, some content (e.g., targeted advertisements) are more suitable to groups watching together, as opposed to couples or solo viewers, and vice-versa, and therefore, it is important to have insight into such data in real or near-real time for targeted advertising.

Current systems determine the number of set-top boxes, streaming and casting devices, smart devices, and the like, which are deployed in a geographical area as large as countries and regions, down to an individual home, and which are tuned to a particular program or media content. However, these systems cannot determine the number of viewers of each device. For example, when a user is watching an over-the-top (OTT) platform provider such as Netflix with three other friends, the platform provider knows that a single instance of the media content has been watched, but not by how many people. Therefore, it must estimate or assume that only an individual watched the program, and either one is likely to result in inaccurate data.

In particular, for large events such as the Olympics, the Superbowl, or Glastonbury Festival, viewers are very likely to gather to watch the event together. The static information gathered by current systems cannot account for this influx of viewers in any particular location and therefore cannot provide information that the broadcasters can rely on. Moreover, such events can be long, and people may arrive and leave at a viewing party, or only care to watch certain parts of the event such as the 100-meter sprint, or their favorite band. Accordingly, current systems cannot determine the change in viewers over the course of an event, show, or day—when, for example, the set-top box remains on a single channel for a long period of time.

The present disclosure enables a media device (e.g., TV, set-top box, etc.) to automatically trigger a device discovery process at specific times during a broadcast (e.g., at the beginning of the program, at the end, when it is detected that an ad is playing, etc.) in order to estimate the number of viewers based on the number of user devices in the vicinity of the media device. The media device can trigger the data collection process through tags, elements, or attributes in a media asset manifest file. Such tags can be associated with specific media segments (e.g., segments associated with an advertisement, or segments associated with any portion of the media content). Additionally, the device discovery process can be triggered ahead of time (e.g., 60 seconds before the media segment is about to play) in order to count the number of viewers that were present during the segment but not present during a next segment.

FIG. 1 shows an illustrative embodiment of a plurality of users, a plurality of user devices, and a media device, in accordance with some examples of the disclosure. User devices 102, 104, and 106 are associated with users 108, 110, and 112, respectively. Users 108 and 110 are watching media content on media device 114 within room 120, and user 112 is outside of room 120 and is not watching media device 114.

In some examples, a set-top box, a smart TV, a streaming device, smart device, or the like, represented by the media device 114, determines a user (e.g., user 108) is viewing the media device 114 by detecting a user device 102 within a certain range of the media device (e.g., within the room 120). For example, the media device 114 may detect a distance and direction to a cell phone (e.g., user device 102) with a Bluetooth Low Energy (LE) signal. In particular, the media device may generate for display on the media device 114 a media asset. For example, the media asset may be an adaptive bitrate video, a segment of an adaptive bitrate video, a multicast stream, a unicast stream, or the like.

The media device 114 initiates the first scan, while displaying the media asset, for nearby user devices within a detectable range. For example, the media device 114 may scan for the nearby visible devices with Bluetooth LE. This step may not require the media device 114 to connect to or reveal the Bluetooth ID of the devices. In some examples, the scan is initiated by a media server (not shown), for example, by push notification to an area (e.g., geographical region) that the media device 114 is in, a calendar-related event (e.g., a scheduled time), or a tag within the segment of an adaptive bitrate video manifest. In some examples, the media device 114 may forward the results of the scan to the media server (not shown). The metadata of the results may comprise the number of devices, an indication of the program being viewed on media device 114, and temporal information representing the time the scan was performed. In some examples, the scan results in a list of device identifiers that includes each user's device (e.g., user devices 102, 106, 108), as well as other Bluetooth devices such as smart home hubs (e.g., Amazon Echo, Apple Homepod, or Google Home Mini).

In some examples, the media device 114 determines the number of nearby user devices. For example, the media device 114, may count the individual Bluetooth devices and determine the number of viewers. In some examples, the media device 114 also determines a direction and distance from the media device to each of the user devices. For example, a Bluetooth LE scan may be performed on channels 37, 38, and/or 39 to acquire the necessary information needed to calculate or estimate the distance between the media device 114 and the user devices 102, 104, and 106 as well as estimate the direction of the mobile device relative to the media player. The Bluetooth Core specification (V5.1) includes support for direction-finding capability so that the media device 114 can also determine the direction of the Radio Frequency (RF) signal that is being transmitted from another Bluetooth device (e.g., a smartphone, smart watch, or smart home hub). For the media device 114 to support such a feature, the media device 114 may comprise a transceiver module, such as an antenna array, to support determining the angle of arrival (AoA) at the receiver end (i.e., the media device 114) and angle of departure (AoD) at the transmitter end (i.e., the user devices 102, 104, and 106).

In some examples, media device 114 determines, based on the distance and direction of the user devices, the number of viewers of the media device currently consuming the media asset. For example, since the location of the media device 114 is unlikely to move over a plurality of scans, it is possible to track the moving devices in the detectable range using the direction-finding capabilities as described above. However, any known direction-finding capability such as triangulation (for one or more media devices 114, or the like), or such as that defined in the Bluetooth V5.1 standard (e.g., AoA uses the phase measurements from each antenna to calculate the direction of the transmitted signal). This can also be combined with the received signal strength indication (RSSI) to estimate how far user devices 102, 104, and 106 are from the media device 114.

In some examples, a user 112 can be determined to be outside of room 120 when device 106 is determined to be at a distance greater than the length, width, or size of room 120. In some examples, the size of room 120 can be input by any of the users 108, 110, or 112 via input into media device 114. In some examples, the size of the room may be determined by measuring the distance to each of a plurality of viewers and averaging the distances. In some examples, room 120 is not a physical room but a detectable range, wherein a user in the detectable range is determined to be watching the media device 114.

The viewing distance of TVs varies and depends on such factors as the size and/or resolution of the TV as well as others such as the environment of the TV, the viewing device type/model, and screen size. In some examples, the media device 114 connected to a TV could rely on the TV screen size (e.g., the screen size can be obtained from the TV's XML device description file or Bluetooth's Device ID Profile) to approximate the detectable range. For example, the viewing distance for a 50-inch TV screen is optimal at around 2 to 2.5 meters; therefore, devices within that range (over a predefined period) are assumed to be associated with viewers; especially if the devices change positions (i.e., the devices move in and out of, or remain in the vicinity of the media device 114). The media device 114 may also use the field of view (FOV) value associated (or known, e.g., through testing) with a given TV to determine the parameters of the detectable range. For example, mobile devices near a TV that has a wide viewing angle may all be counted as unique viewers since such TVs support distributed seating arrangements where not all viewers have to sit on the couch or sofa that is located right across from the TV screen to watch and can still watch the content when sitting on an adjacent or nearby sofa (e.g., at an angle relative to the TV). Accordingly, in some examples, the detectable range may be based on at least one of: a signal, the signal comprising an indication of the size of a display communicatively coupled with the media device; a user input; or the average distance from the media device to one or more user devices, based on a received signal strength indication (RSSI) of the scanning signal at the user device.

In some examples, the media device 114 generates for display on the media device 114 a second media asset. For example, the second segment of an adaptive bitrate stream may be displayed on the media device 114. In some examples, the media device 114 may initiate a second scan, while displaying the second media asset. In addition, the media device 114 may compare the first scan data and second scan data to determine a change in the number of viewers; and/or determine if any of the detected user devices are non-viewer devices or static devices. For example, a media device 114 (e.g., a set-top box) may create (or collect device connection data and share it with a backend model creation service) a model of the devices that it detects within the detectable range. Detected objects that don't move often, such as a smart speaker with an integrated Bluetooth chipset, are marked as stationary, and any advertising packets from such devices are ignored (e.g., the model maintains an updated device ID list). In this way, static devices can be determined to be non-viewer devices and not accidentally included in a report to a media server (not shown). The model can be created and refined from static user devices that the media device 114 (e.g., a set-top box) can connect to. Accordingly, the model may develop in complexity over time as additional media devices (such as smart home hub devices or additional set-top boxes) join the scan and increase the detectable range of media device 114 or create a second detectable range. In some examples, every model may be associated with a media device (smart TV, set-top box, streaming media player, etc.) where the model can keep track of multiple electronic devices associated with the detectable range of the respective media device (i.e., in the vicinity of the media device) that often move around.

In some examples, the model is periodically updated (e.g., when there is a change of viewed content/channel, or, hourly, daily, weekly, monthly, or the like) by removing devices that have not been detected in some time. In this way, devices that are no longer in use (e.g., the user has changed smartphones, or a device is lost) can be accounted for. Similarly, adding new devices, for example visitor devices, or newly acquired devices such as a new smartphone for a known user, can be added as the model is periodically updated. In some examples, the model may recognize that a particular device is detected only during a major sporting event or on the release of the latest episode of a series of interest, this may indicate that a guest device is visiting on a regular basis for such events. Accordingly, devices that are known to be guest devices may be remembered for a longer period of time than that in which the model is updated and may last a plurality of update cycles before being removed from the model. In some examples, the model can also avoid double counting of a user by not counting two devices determined to be associated with a single user (e.g., by information provided by a user, detecting the proximity of said devices, or other methods as discussed herein). For example, a smartphone and a smart watch owned by the same user will count for only one viewer rather than two. In further examples, the one or more devices associated with one user are prioritized.

In some examples, the Bluetooth chipset on the media device 114 can operate in dual mode (classic or BD/EDR, and Bluetooth LE) as supported by the latest version of the Bluetooth standard and can switch to and use a specific mode (e.g., Bluetooth LE scan mode) once instruction to initiate a scan received.

In some examples, the media device 114 may receive, from each user device, an indication of identity. While the indication of identity is not necessary to determine the number of nearby user devices, further assigning the indication of identity for each of the user devices to a viewer profile, and/or assigning the indication of identity for each non-viewer device or static device to a non-viewer profile, can help build user history. The user profile, and therefore user devices, can then be associated with the users 108, 110, 112. In building user profiles and recording user history, content suggestions, and targeted advertisements, analytical information (such as watch time, watch frequency, and the like) can be generated.

In some examples, after generating user profiles, the media device 114 may determine, based on the direction and distance, that one or more user devices are associated with the same user and therefore assign the indication of the identity of the devices associated with the same user to the corresponding viewer profile. For example, a user 112 may have a user device 106, a smartphone, and additional user devices (not shown) such as a tablet and smart watch. Media device 114 may determine that user device 106 is regularly in close proximity to the tablet and smart watch, which are likely associated ith (owned, frequently used by, etc.) user 112. In some examples, a priority of user devices may be generated or determined. For example, user 112 may always wear their smart watch, but often leaves their user device 106 in a different room (e.g., charging) and therefore the detection of the user's smart watch may be given priority over the other user devices within the user's user profile.

In some examples, the media device 114 may assign the consumed media asset to the viewer profile, and recommend, based on at least one viewer profile, a third media asset to be consumed. In some examples, the recommending further comprises determining, based on first and second scan data, the presence of one or more viewers (e.g., users) and additionally, determining a common interest between two or more viewers, based on previously consumed media content. The common interest may be one or more of a genre, series history, cast members, favorite actors, most viewed media content, most-watched media content, unwatched episodes of a series, or common viewing history. In some examples, the media device 114 may select a third media asset to be consumed based on the common interest between one or more viewers (e.g., users 108 and 110).

In some examples, the first scan may be initiated in response to a trigger event. A trigger event may be any one or more of an instruction to initiate the scan, for example from a media server; a scheduled time to initiate the scan, for example, a calendar-related event; a request for content by a user, for example by a viewer of the media asset; a tag in a manifest of a media content item being consumed on the media device, for example, the manifest may be a master playlist of an adaptive bitrate stream and the tag may be an element within the manifest; or the expiration of a timer, wherein the timer was initiated in response to a first scan ending.

The media device 114 may continuously monitor the detectable range for user devices. For example, the media device 114 may monitor the detectable range for the various cell phones, mobile devices, and laptops that may enter and leave the detectable range. The media device 114 may measure a frequency of access for each device (e.g., user devices 102, 104, and 106) that enter and leave the detectable range (e.g., room 120). For example, the media device 114 may record each time a user device enters the detectable range and calculate a regular frequency for that user device over a time period, such as a weekly or monthly frequency. As a specific example, the media device 114 records whether the user device 102 enters the detectable range while a media asset is being displayed every day for five hours, in which case the frequency is once a day, or enters the detectable range while a media asset is being displayed on the media device 114 once a week for only two hours. The media guidance device 114 may compare the frequency of each device (e.g., user devices 102, 104, and 106) entering the detectable range. The media device 114 may then, based on the comparing, determine that the frequency of access for a new device (e.g., user devices 102, 104, and 106) is above a threshold. For example, the threshold may be any user device that enters the detectable range while a media asset is being displayed (e.g., enters room 120) at least once a week. The identified user device 102 may enter the detectable range (e.g., room 120) daily and so exceed the threshold. In another example, the user device 106 may enter the detectable range (e.g., room 120) only once a week and so fail to exceed the threshold. The media device 114 may add a new device identifier associated with the new device (e.g., user device 102) to a user profile or a guest user profile. For example, the user device 102 that has been determined to enter the detectable range at a frequency above the threshold may be added to a viewer profile.

The media device 114 may identify a user device (e.g., device 104) as a guest device. For example, the media device 114 determines that the user device is a viewer device based on the distance and direction of the Bluetooth LE scan; however, it does not recognize the device with a current user profile. Therefore, the media device 114 may identify device 104 associated with the device identifier as a guest device.

In some examples, the media device 114 may verify whether device 106 is a guest device or a new device associated with user 112 of the network by detecting a user account associated with the device. For example, user 112 may bring home a new device (e.g., user device 106) that has not yet entered the detectable range of the media device 114, and be prompted to log in with a username that connects the device to the user's account. In this specific example, the new device (e.g., user device 106) would not be identified as a guest device, even though the device is new, because it is associated with a user account (e.g., a user profile) that has other devices that are already identified as entering the detectable range regularly. In some examples, the media device 114 may determine a list of user accounts associated with each device identifier in the set of device identifiers, search the list of user accounts for the detected user account, and, based on the search, add the device ID for the identified device to the set of device identifiers. For example, the media device 114 may determine a list of user accounts based on the user accounts associated with each laptop that regularly accesses the network so that, when a user buys a new laptop associated with one of the listed user accounts, the media device 114 automatically identifies the laptop and adds the laptop to the list of devices associated with the network.

In some examples, the media device 114 determines a set of media assets currently available that match the set of interests of the user (e.g., user 110) from the associated user profile. For example, the media device 114 may, based on the user profile, identify a sports game currently playing based on the user's favorite team or may identify a movie about to start based on the user's favorite actor. In another example, the user profile may include account information for other social networks, such as Twitter, and determine the programs and interests of the user (e.g., user 110) based on who the user follows on these social networks, such as Twitter. In some examples, the media device 114 may determine a set of media assets currently available by retrieving a list of favorite media assets associated with the user profile, retrieving a schedule of recordings associated with the user profile, and searching a program guide schedule for a media asset that matches at least one of 1) a media asset on the list of favorites, 2) a media asset on the schedule of recordings, or 3) a media asset in the set of interests of the user (e.g., user 110). For example, the media device 114 may search the program guide for programs currently playing or about to start for programs that match items on the user's favorites list such as a favorite movie. In another example, the media device 114 may search the program guide for programs that the user has scheduled to record on his home DVR. In yet another example, the media device 114 may search for a television show in the program guide because the guest follows the official account for the show on a social network such as Twitter.

In some examples, the media device 114 also triggers a smart speaker to periodically record short audio clips where the clips are analyzed (e.g., on a media server) to detect the number of distinct voices. The audio clips are used in combination with the user device data from the first and/or second scan data to determine the number of unique users. In some examples, the audio clips are collected at random times during the displaying of one or more media assets so that the probability of counting every present viewer is higher. In some examples, the audio clips can be used for validating the count of users and discarded after analysis. In another example, the presence of children can be accounted for based on the profile of the user, who is not likely to have user devices of their own, as well the genre of the media asset, and the time of the media asset.

Figure 2:
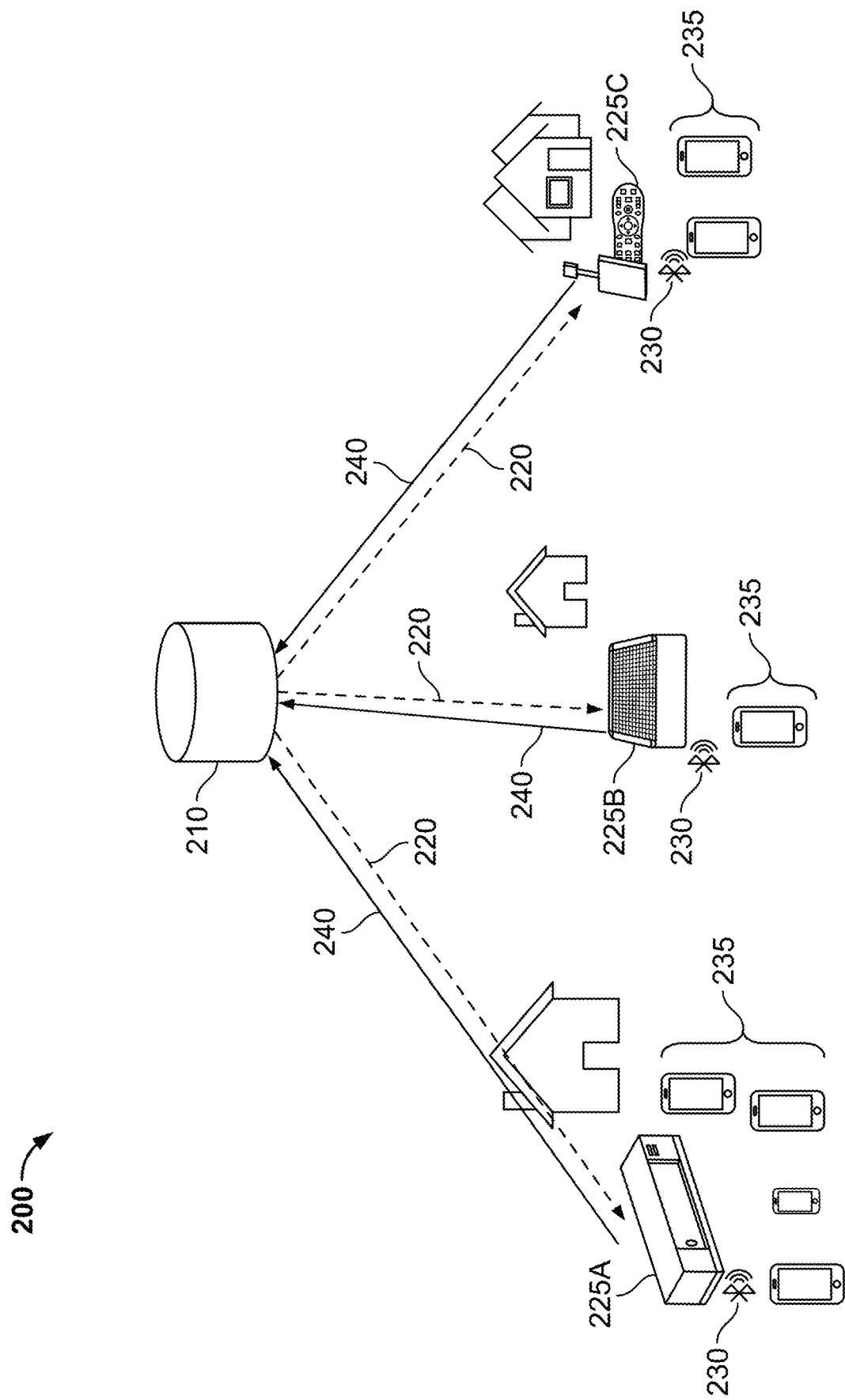
FIG. 2 illustrates a exemplary media server and plurality of media devices and user devices, in accordance with some examples of the disclosure.

FIG. 2 illustrates an exemplary media server and a plurality of media devices, and user devices, in accordance with some examples of the disclosure. As illustrated, the system 200 in FIG. 2 comprises a media server 210. In some examples, the media server 210 sends a signal through downstream link 220 to a plurality of media devices 225. The signal may be a push notification to initiate a scan or a manifest file comprising instruction, or the like. On receiving the signal to initiate a scan, each of the media devices 225 will perform a scan and determine the number of nearby user devices 235 with any of the methods as described herein. Upon determining the number of nearby user devices 235, media devices 225 may return the result of the scan to server 210 through upstream link 240.

It should be noted that the separate upstream communication link 220 and downstream communication link 240 are shown as such, but may be the same link. In particular, the separate communication links illustrate that the initiation of the scan may come from server 210, or may be any one of a scheduled time to initiate the scan; a request for content by one of the viewers; a tag in a manifest of a media content item being consumed on the media device 225; or the expiration of a timer, wherein the timer was initiated in response to a first scan ending. In such cases, the upstream communication link 240 may be established without any downstream communication from the media server 210 being required, except perhaps an ACK or NACK in response to the uploading of the result data of the scan to the media server 210 by the media device 225.

Figure 3:
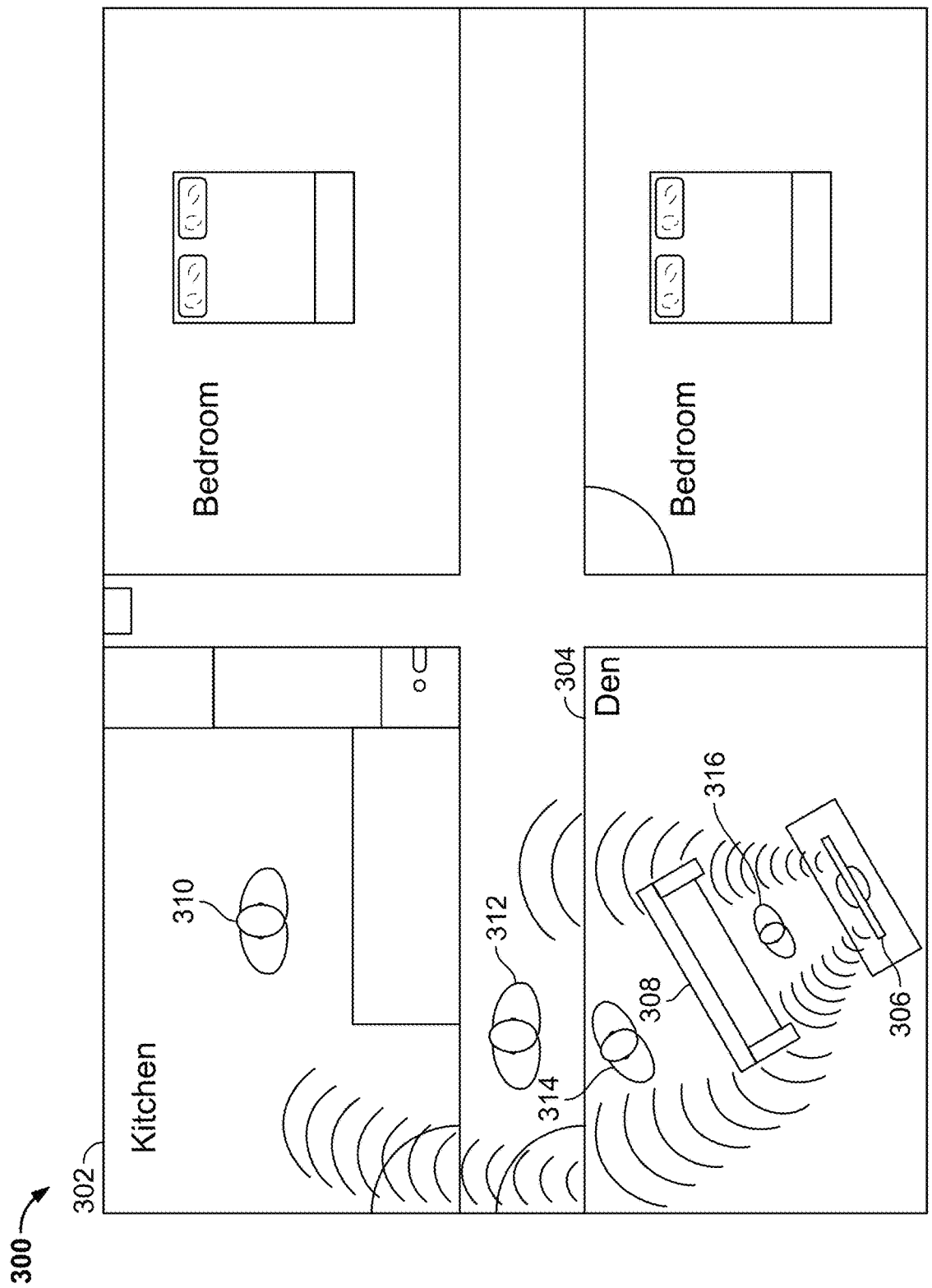
FIG. 3 illustrates a layout of a home, where an ability of a person to hear or see media being displayed by user equipment is monitored, in accordance with some examples of the disclosure.

FIG. 3 illustrates a layout of a home, where an ability of a person to hear or see media being displayed by the user equipment is monitored, in accordance with some examples of the disclosure. As illustrated, FIG. 3 includes kitchen 302, den 304, user equipment 306, and obstacle 308. Obstacle 308, while illustrated as a couch, may be any obstacle that obstructs a line of sight when obstacle 308 stands between a person's eyes and a display component of user equipment. Kitchen 302 and den 304, as used herein, may be replaced by any other bounded area inside or outside of a household, and are named "kitchen" and "den" for illustrative purposes only; they also may be referred to as a detectable area.

FIG. 3 also illustrates several positions at which a user may be detected (e.g., position 310, position 312, position 314, and position 316). The detection may be achieved by way of a media device, such as media device 114, interacting with one or more user devices, such as user devices 102, 104, and 106. These positions are not an exhaustive list of positions at which the media device 114 may detect a user.

In some examples, a media device 114 may cause the output of a video to a display device of a first user. For example, as depicted, obstacle 108 is a couch. A first user named may be sitting on the couch, and may be consuming video by way of user equipment 306, which has a display component that is facing the couch. The media device 114, instead of causing the output of the video to a display component of user equipment 306, may simply detect that the video is being displayed by the display component of user equipment 306. The methods discussed above to be performed by the media device 114 may be executed, in whole or in part, by control circuitry of user equipment 306, by other user equipment within household 300, and/or by a server remote from household 300.

The media device 114 may determine whether a user is at a given position (e.g., position 310, position 312, position 314, and position 316), and thus determine whether or not the user is within the detectable range. At each position, the user may input whether or not they can see the media asset being displayed on user equipment 306. For example, when the user is at position 316 or 314, the user may input that they can view the media asset; however, at position 312, they cannot. In this way, the RSSI can be tuned to determine the detectable range. Accordingly, media device 114 can determine that when the user is at a position from which the user cannot view the media asset being displayed.

In some examples, the media device 114 may require information about either a relative location (e.g., with respect to obstacles, such as obstacle 108, a wall of a room, and the like), or an absolute location (e.g., based on the AoA, AoD, and RSSI) of the given position in order to determine whether, at that position, the user can consume the media asset being displayed on user equipment 306 (e.g., see or hear the media asset, based on the user's subjective determination). The media device 114 may determine an absolute location of the user within the household with, for example, the use of RSSI measurements with respect to multiple devices (e.g., if the user is carrying around a user device, the user device's signal strength may be compared with respect to multiple other devices with known locations in household 300, and this totality of information may be used to determine where the user is located).

After determining the location of the user, the media device 114 may determine, based on that location, whether the second user can see or hear the video being displayed by the display component of user equipment 306. For example, if the media device 114 determines that the user is at position 310, the media device 114 may determine that the second user can neither see nor hear the video.

Before or after the media device 114 determines that the user has come to position 308 (and thus has become within the detectable range of the media device 114), the media device 114 may determine the identity of the user. The reason the media device 114 would determine the identity of the user is to determine whether the user is associated with user profile information that includes watching history, among other data.

Figure 4:
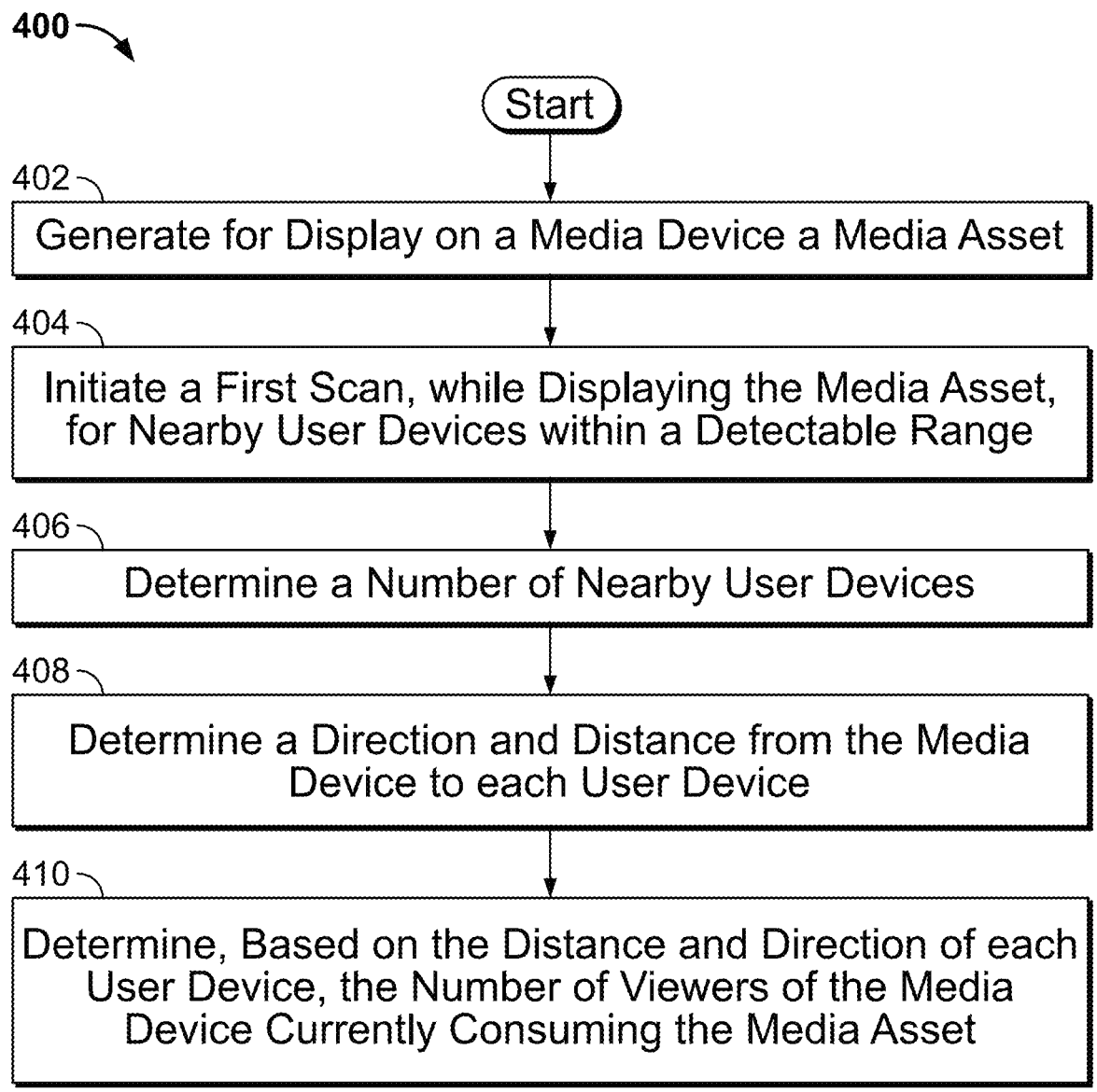
FIG. 4 illustrates an exemplary flowchart of the processing involved in detecting a number of viewers of a media device, in accordance with embodiments of the disclosure.

FIG. 4 illustrates an exemplary flowchart of the processing involved in selecting a plurality of content items based on complexity and bandwidth, in accordance with embodiments of the disclosure. Process 400 starts at step 402, wherein a media asset for display on a media device is generated. In some examples, the media device may be a set-top box, a smart T, a streaming device, smart device, a tablet, a laptop, a PC, or the like. The media asset may be an adaptive bitrate video, a segment of an adaptive bitrate video, a multicast stream, a unicast stream, or the like.

At step 404, a first scan, while the media asset is displayed, for nearby user devices within a detectable range is initiated. For example, the media device 114 may scan for the nearby visible devices with Bluetooth LE. This step may not require the media device 114 to connect to or reveal the Bluetooth ID of the devices. In some examples, the scan is initiated by a media server (not shown), for example, by push notification to an area (e.g., geographical region) that the media device 114 is in, a calendar-related event (e.g., a scheduled time), or a tag within the segment of an adaptive bitrate video manifest.

At step 406, the number of nearby user devices is determined. For example, the media device 114 may count the individual Bluetooth devices counted and determine the number of viewers. At step 408, the direction and distance from the media device to each user device are determined. For example, a Bluetooth LE scan may be able to acquire the necessary information needed to calculate or estimate the distance between the media device and the user devices as well as estimate the direction of the mobile device relative to the media player, in some examples, determining AoA at the media device, AoD at the user devices, and the RSSI to estimate how far user devices are from the media device.

At step 410, the number of viewers of the media device currently consuming the media asset, based on the distance and direction of each user device, is determined. For example, since the location of the media device 114 is unlikely to move over a plurality of scans, it is possible to track the moving devices in the detectable range using the direction-finding capabilities as described in the Bluetooth Core specification (V5.1) and referenced above.

Figure 5:
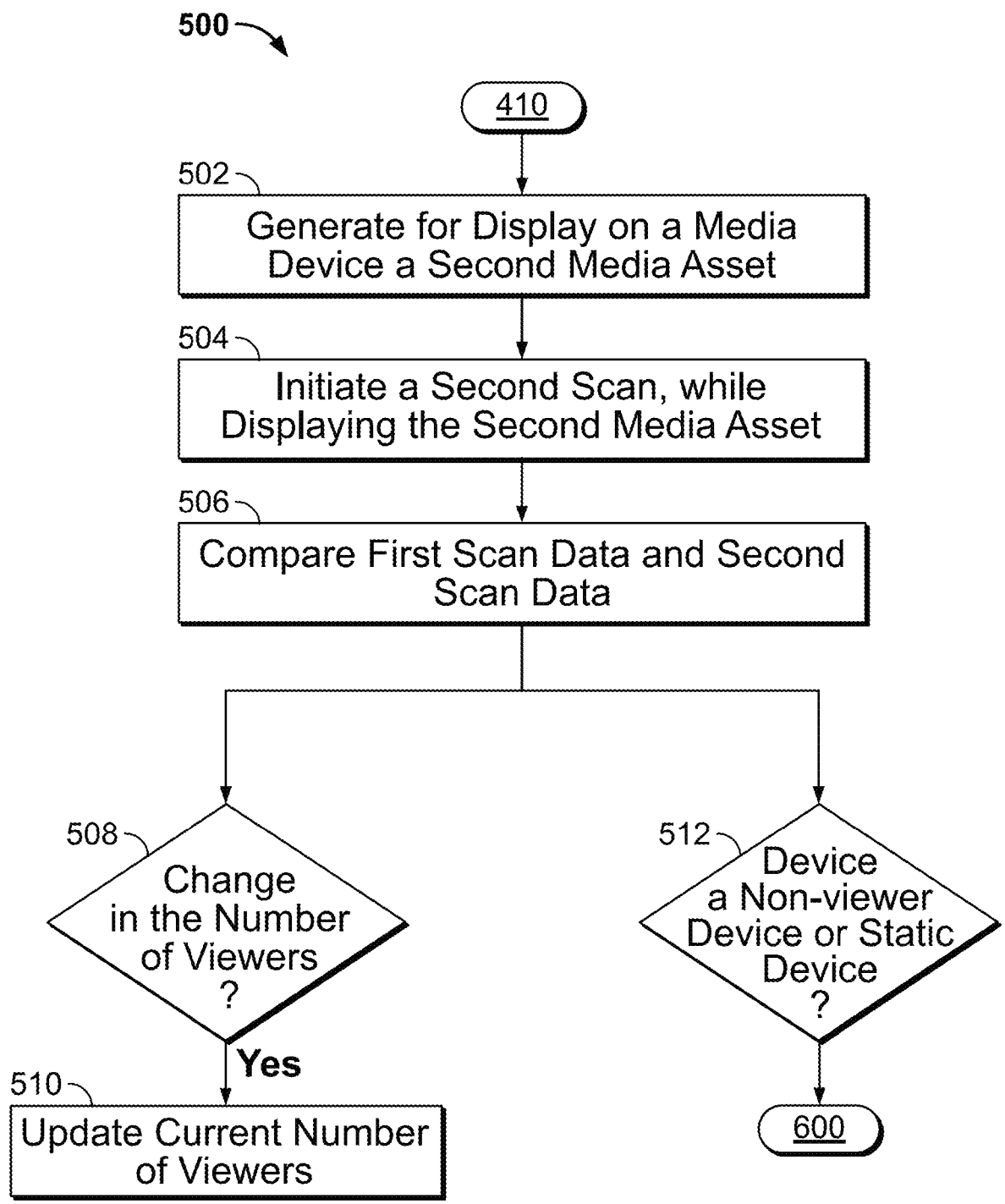
FIG. 5 illustrates an exemplary flowchart of the processing involved in determining if a detected user device is a non-viewer device and a change in the number of viewers, in accordance with embodiments of the disclosure.

FIG. 5 illustrates an exemplary flowchart of the processing involved in determining if a detected user device is a non-viewer device and if there is a change in the number of viewers of a media asset, in accordance with embodiments of the disclosure. Process 500 begins at step 502. In some examples, step 502 follows step 410 as shown in FIG. 5, however, it should also be understood that some steps in processes 400 and 500 may be performed in parallel.

At step 502, a second media asset for display on a media device is generated. As with process 400, the media asset may be an adaptive bitrate video, a segment of an adaptive bitrate video, a multicast stream, a unicast stream, or the like.

At step 504, a second scan, while displaying the media asset, for nearby user devices within a detectable range is initiated. At step 506 the first scan data and second scan data are compared. At step 508, it is determined if there is a change in the number of viewers of the second media asset being displayed, as compared to the first media asset that was previously displayed. If there is a change in the number of viewers, process 500 continues to step 510, wherein the current number of viewers is updated. For example, the media device may forward the results of the second scan to the media server. The metadata of the results may comprise the number of devices, an indication of the program being viewed on the media device; temporal information representing the time the scan was performed, an update to the number of viewers if the second media asset is associated with the first media asset, or a combination of any of this information.

At step 512, the comparison comprises determining if any of the detected devices are non-viewer devices or static devices. For example, a media device (e.g., a set-top box) may detect user devices within the detectable range that don't move often, such as a smart speaker with an integrated Bluetooth chipset or the like. Such devices may have the same AoD, AoA, and RSSI in both scans, which is an indication that the detected device is a static device. In such cases, any advertising packets from this device are ignored; therefore, static devices can be determined to be non-viewer devices and not accidentally included in the result data for a number of viewers.

Figure 6:
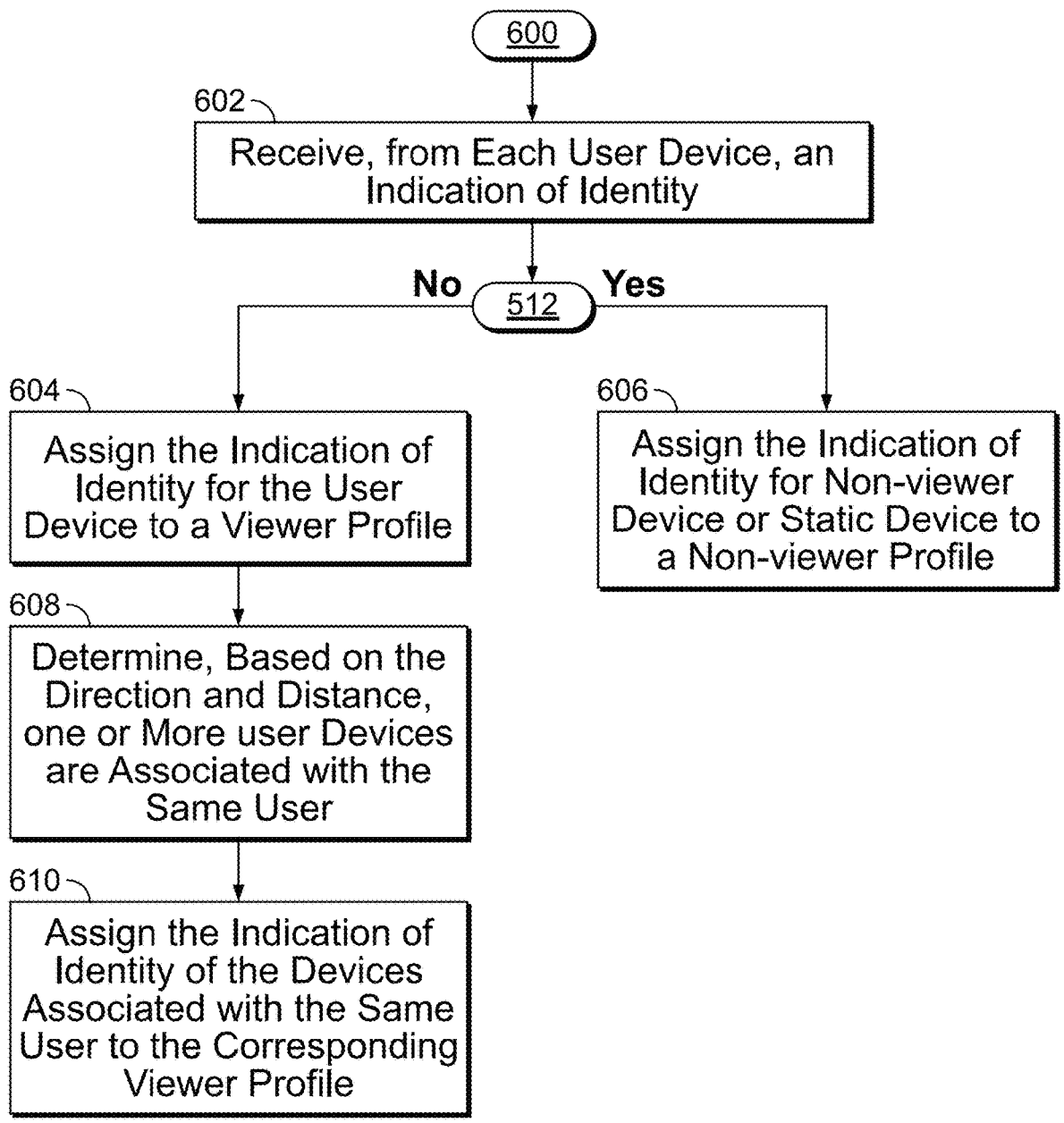
FIG. 6 illustrates an exemplary flowchart of the processing involved in assigning indication of identities of user devices to viewer or non-viewer profiles, in accordance with embodiments of the disclosure.

FIG. 6 illustrates an exemplary flowchart of the processing involved in assigning indication of identities of user devices to the viewer or non-viewer profiles, in accordance with embodiments of the disclosure. Process 600 begins at step 602. In some examples, step 602 follows step 512 as shown in FIG. 5, however, it should also be understood that some steps in processes 400, 500, and 600 may be performed in parallel.

At step 602, an indication of identity is received from each user device. In some examples, the indication of identity is the first request; before it is received, however, some user devices may offer an indication of identity in the first instance. Before proceeding to step 604 or step 606, for each device from which an indication of identity is received, step 512 is carried out, namely, determining if the user device from which the indication of identity was received is a non-viewer device or static device.

If the answer to step 512 is no, then process 600 continues on to step 604. At step 604, the indication of identity for the user device is assigned to a viewer profile. In some examples, the viewer profile is associated with a particular user. If the answer to step 512 is yes, then process 600 continues on to step 606. At step 606, the indication of identity for the non-viewer device or static device is assigned to a non-viewer profile. In some examples, there may only be one non-viewer profile. In some examples, there may be a non-viewer profile associated with each media device in the household, such that different non-viewer devices can be associated with different parts of the household.

In some examples, process 600, after completing step 604, continues to step 608. At step 608, based on the direction and distance data in the first and second scans, it is determined whether or not one or more user devices are associated with the same user. For example, a user may have a user device, a smartphone, and additional user devices such as a tablet and smart watch. The media device may determine that the user device is regularly in close proximity to the tablet and smart watch and is likely associated with (or owned, frequently used by, etc.) the same user.

In some examples, process 600, after completing step 608, continues on to step 610. At step 610, the indication of the identity of the devices associated with the same user is assigned to the corresponding user, or indeed viewer, profile.

Figure 7:
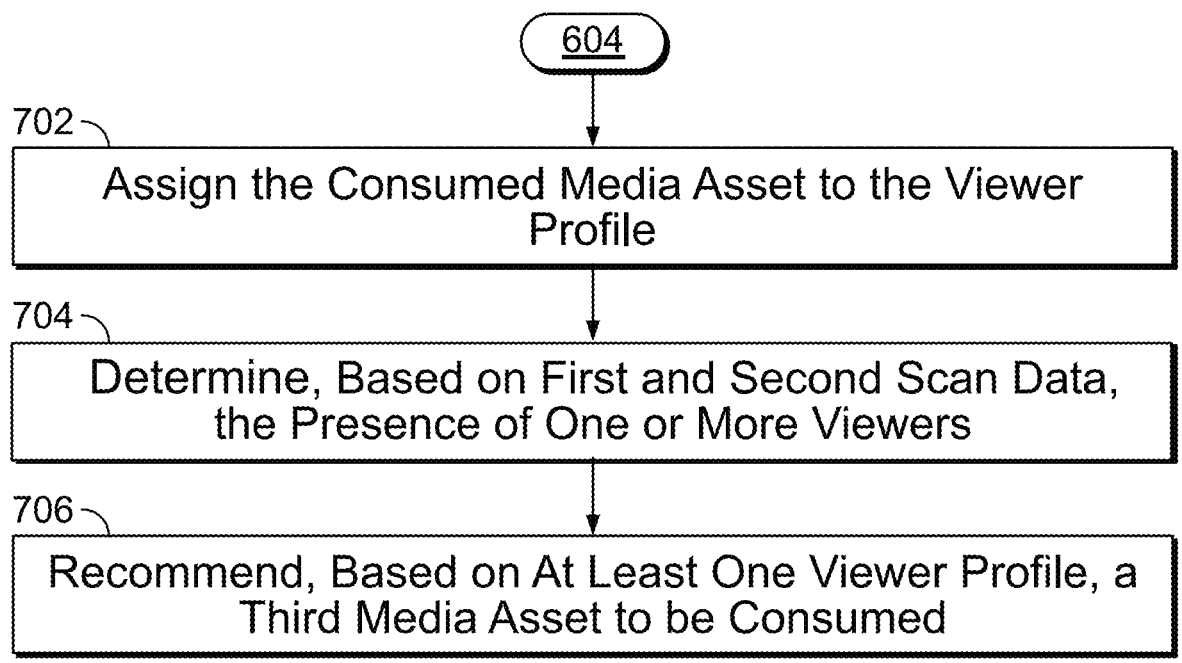
FIG. 7 illustrates an exemplary flowchart of the processing involved in recommending a third media asset to be consumed, in accordance with embodiments of the disclosure.

FIG. 7 illustrates an exemplary flowchart of the processing involved in recommending a third media asset to be consumed, in accordance with embodiments of the disclosure. Process 700 begins at step 702. In some examples, step 702 follows step 604 as shown in FIG. 6; however, it should also be understood that some steps in processes 400, 500, 600, and 700 may be performed in parallel.

At step 702, the consumed media asset(s) are assigned to the viewer profiles of the users present while the media asset was being displayed on the media device. After step 702, process 700 may continue to step 704 or skip on to step 706. At step 704, the presence of one or more viewers is determined, based on the first and second scan data. At step 706, a third media asset to be consumed is recommended, based on at least one viewer profile.

In some examples, step 704 may not be appropriate if it is known to the media device that only one viewer is present. For example, it may be known that a certain user always watches TV alone or that a scan was just, is about to, or is currently being, performed. In some examples, the viewing history of a single viewer from the user profile (or viewer profile) may be accessed and used in the recommendation of a third media asset. In some examples, the media device 114 may select a third media asset to be consumed based on the common interest between the two or more viewers or the viewing history of a viewer.

Figure 8:
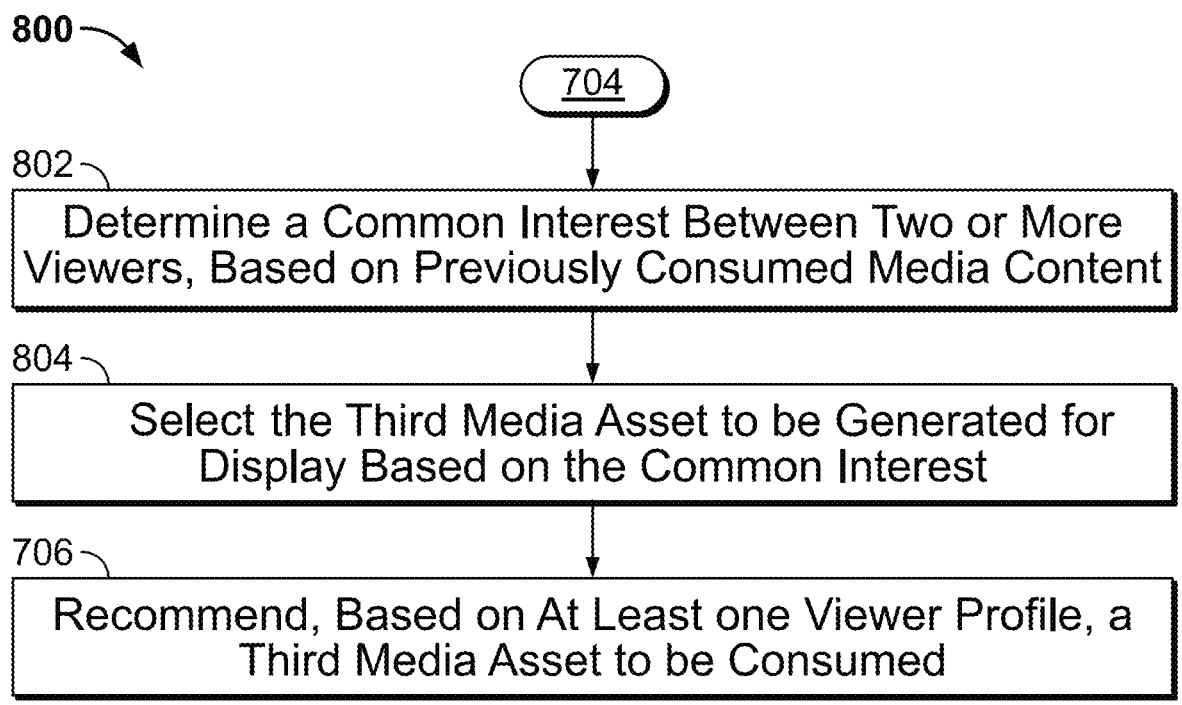
FIG. 8 illustrates an exemplary flowchart of the processing involved in determining a common interest between two or more viewers, in accordance with embodiments of the disclosure.

FIG. 8 illustrates an exemplary flowchart of the processing involved in determining a common interest between two or more viewers, in accordance with embodiments of the disclosure. Process 800 begins at step 802. In some examples, step 802 follows step 704 as shown in FIG. 7, however, it should also be understood that some steps in processes 400, 500, 600, 700, and 800 may be performed in parallel.

At step 802, a common interest between two or more viewers, based on previously consumed media content, is determined. In some examples, a common interest between the two or more viewers, based on previously consumed media content, may be determined and used in the recommendation of a third media asset. The common interest may be one or more of a genre, series history, recently viewed cast member, favorite actor, most viewed media content, most-watched media content, unwatched episodes of a series, or common viewing history.

At step 804, a third media asset to be generated for display (and consumed by the viewers) is selected based on the common interest between the two or more viewers. After step 804, process 800 may continue to step 706, or a step substantially similar to step 706. At step 706, a third media asset to be consumed is recommended, based on at least one viewer profile.

Figure 9:
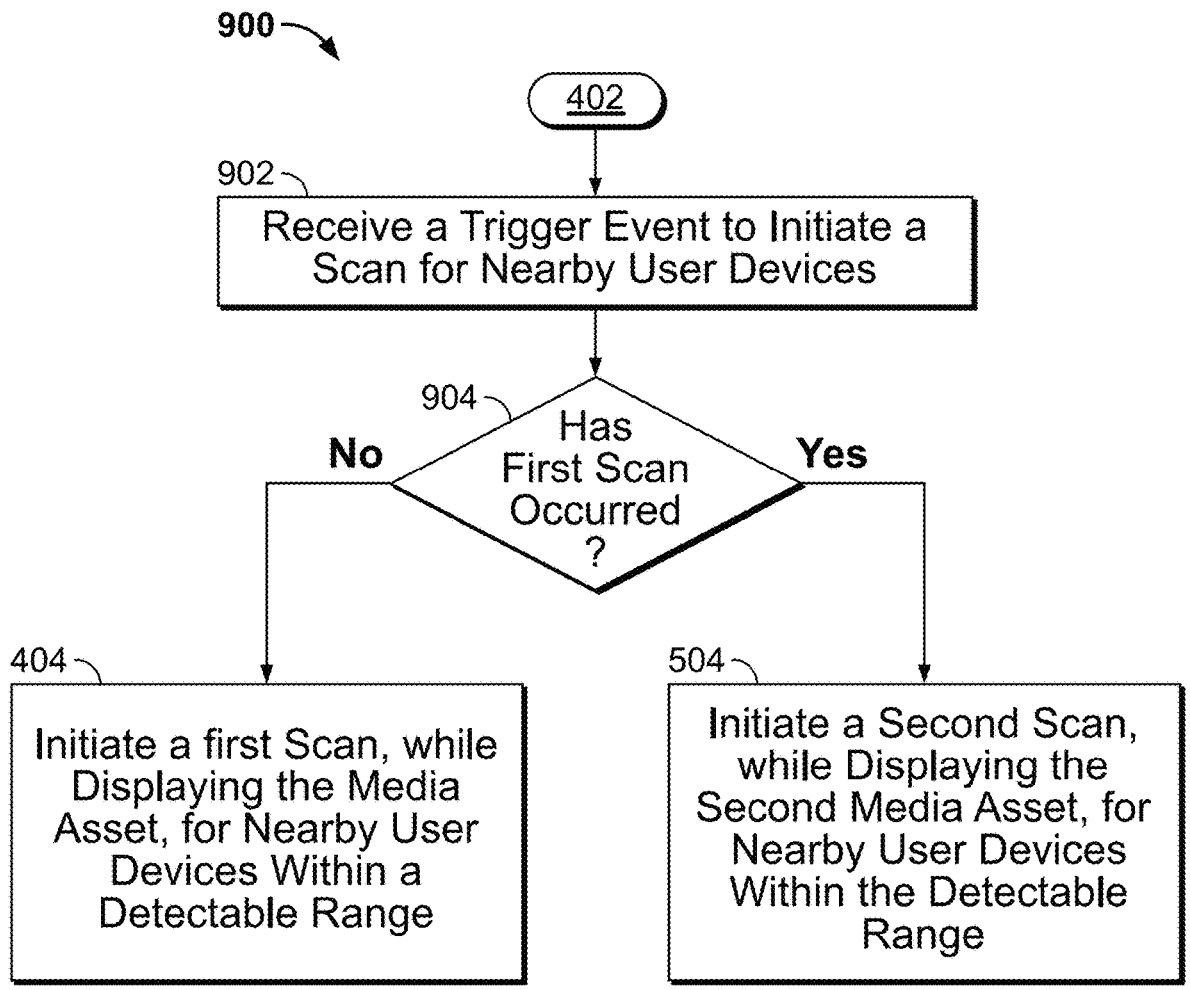
FIG. 9 illustrates an exemplary flowchart of the processing involved in receiving a trigger event to initiate a scan for nearby devices, in accordance with embodiments of the disclosure.

FIG. 9 illustrates an exemplary flowchart of the processing involved in receiving a trigger event to initiate a scan for nearby devices, in accordance with embodiments of the disclosure. Process 900 begins at step 902. In some examples, step 902 follows step 402 as shown in FIG. 4;

however, it should also be understood that some steps in processes 400, 500, 600, 700, 800, and 900 may be performed in parallel.

At step 902, a trigger event to initiate a scan for nearby user devices is received. In some examples, the trigger event is at least one of an instruction to initiate the scan; a scheduled time to initiate the scan; a request for content by one of the viewers; a tag in a manifest of a media content item being consumed on the media device; or the expiration of a timer, wherein the timer was initiated in response to a first scan ending. In some examples, the trigger event is received from a media server, directly, in the case of a push notification, or indirectly, in the case of a tag in a manifest for a media content item.

At step 904, it is determined whether or not a first scan has occurred. If the answer at step 904 is no, then process 900 continues to step 404 of process 400. At step 404, a first scan, while displaying the media asset, for nearby user devices within a detectable range is initiated. For example, the media device 114 may scan for the nearby visible devices with Bluetooth LE. This step may not require the media device 114 to connect to or reveal the Bluetooth ID of the devices. In some examples, the scan is initiated by a media server (not shown), for example, by push notification to an area (e.g., geographical region) that the media device 114 is in, a calendar-related event (e.g., a scheduled time), or a tag within the segment of an adaptive bitrate video manifest.

If the answer to step 904 is yes, then process 900 continues to step 504 of process 500. At step 504, a second scan, while displaying the second media asset, for nearby user devices within a detectable range is initiated. In some examples, the second scan is performed substantially the same way the first scan is performed.

Figure 10:
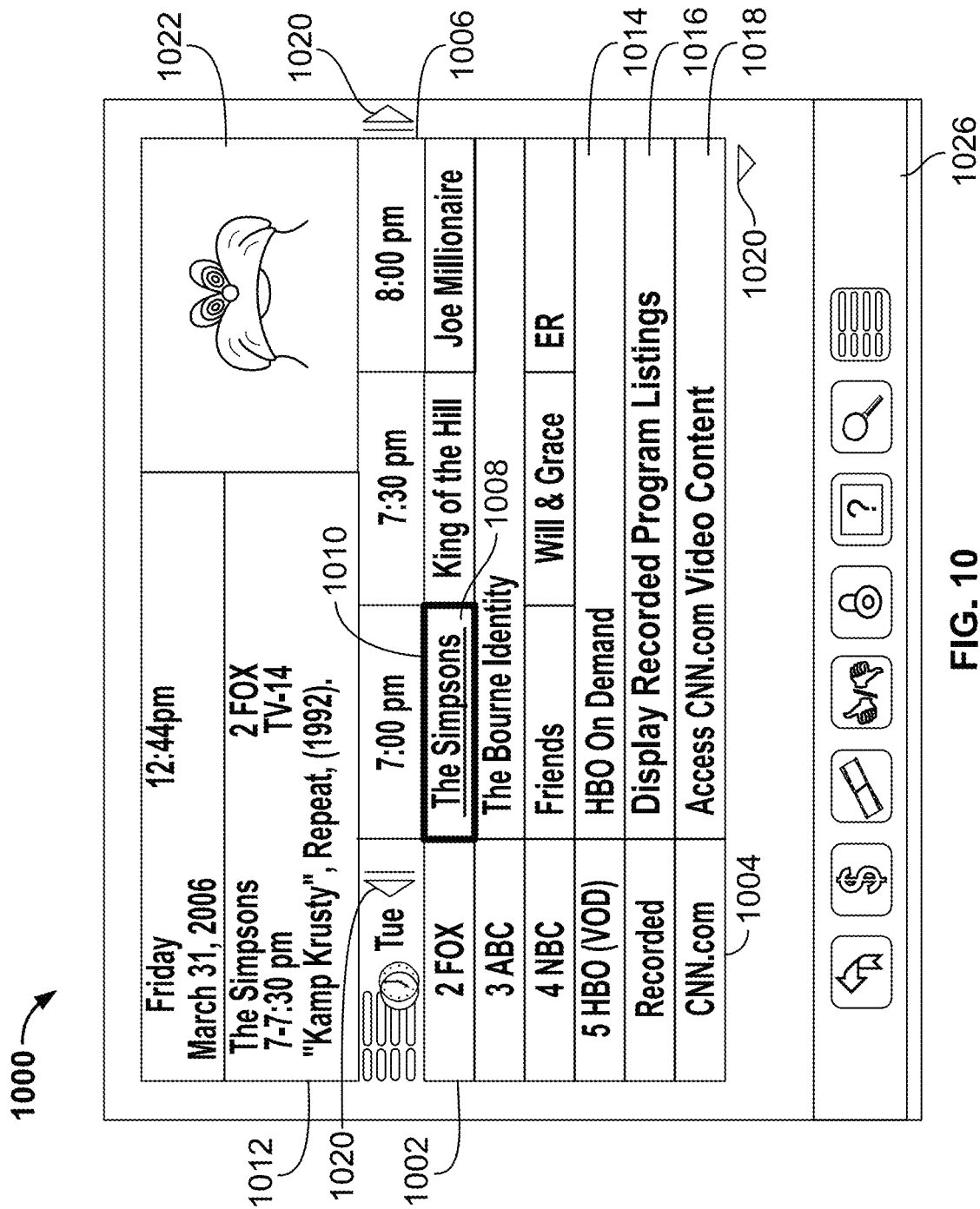
FIG. 10 shows an illustrative embodiment of a display screen that may be used to provide media device listings and other media guidance information, in accordance with some embodiments of the disclosure.

FIG. 10 shows an illustrative grid of a program listings display 1000 arranged by time and channel that also enables access to different types of content in a single display. Display 1000 may include grid 1002 with: (1) a column of channel/content type identifiers 1004, where each channel/content type identifier (which is a cell in the column) identifies a different channel or content type available; and (2) a row of time identifiers 1006, where each time identifier (which is a cell in the row) identifies a time block of programming. Grid 1002 also includes cells of program listings, such as program listing 1008, where each listing provides the title of the program provided on the listing's associated channel and time. With a user input device, a user can select program listings by moving highlight region 1010. Information relating to the program listing selected by highlight region 1010 may be provided in program information region 1012. Region 1012 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media device also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or another storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 1002 may provide media guidance data for non-linear programming including on-demand listing 1014, recorded content listing 1016, and Internet content listing 1018. A display combining media guidance data for content from different types of content sources is sometimes referred to as a "mixed-media" display. Various permutations of the types of media guidance data that may be displayed that are different than display 1000 may be based on user selection or guidance application definition (e.g., a display of only recorded and broadcast listings, only on-demand and broadcast listings, etc.). As illustrated, listings 1014, 1016, and 1018 are shown as spanning the entire time block displayed in grid 1002 to indicate that selection of these listings may provide access to a display dedicated to on-demand listings, recorded listings, or Internet listings, respectively. In some embodiments, listings for these content types may be included directly in grid 1002. Additional media guidance data may be displayed in response to the user selecting one of the navigational icons 1020. (Pressing an arrow key on a user input device may affect the display in a similar manner as selecting navigational icons 1020.)

Display 1000 may also include video region 1022, and options region 1026. Video region 1022 may allow the user to view and/or preview programs that are currently available will be available, or were available to the user. The content of video region 1022 may correspond to, or be independent of, one of the listings displayed in grid 1002. Grid displays including a video region are sometimes referred to as picture-in-guide (PIG) displays. PIG displays and their functionalities are described in greater detail in Satterfield et al. U.S. Pat. No. 6,564,378, issued May 13, 2003, and Yuen et al. U.S. Pat. No. 6,239,794, issued May 29, 2001, which are hereby incorporated by reference herein in their entireties. PIG displays may be included in other media device display screens of the embodiments described herein.

Options region 1026 may allow the user to access different types of content, media device displays, and/or media device features. Options region 1026 may be part of display 1000 (and other display screens described herein) or may be invoked by a user by selecting an on-screen option or pressing a dedicated or assignable button on a user input device. The selectable options within options region 1026 may concern features related to program listings in grid 1002 or may include options available from the main menu display. Features related to program listings may include searching for other air times or ways of receiving a program, recording a program, enabling series recording of a program, setting program and/or channel as a favorite, purchasing a program, or other features. Options available from the main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media device may be personalized based on a user's preferences. A personalized media device allows a user to customize displays and features to create a personalized "experience" with the media device. This personalized experience may be created by allowing a user to input these customizations and/or by the media device monitoring user activity to determine various user preferences. Users may access their personalized guidance application by logging in or otherwise identifying themselves with the guidance application. Customization of the media device may be made in accordance with a user profile. The customizations may include varying presentation schemes (e.g., the color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media device may allow a user to provide user profile information or may automatically compile user profile information, in combination with the detection of user devices, the media device may, for example, monitor the content the user accesses and/or other interactions the user may have with other applications. Additionally, the media device may obtain all or part of other user profiles that are related to a particular user (e.g., from other websites on the Internet the user accesses, such as www.Tivo.com, from other media devices the user accesses, from other interactive applications the user accesses, from another user equipment device of the user, etc.), and/or obtain information about the user from other sources that the media device may access. As a result, a user can be provided with a tailored user guide experience based on content that the user watched, based on the presence of a user's different user devices.

Figure 11:
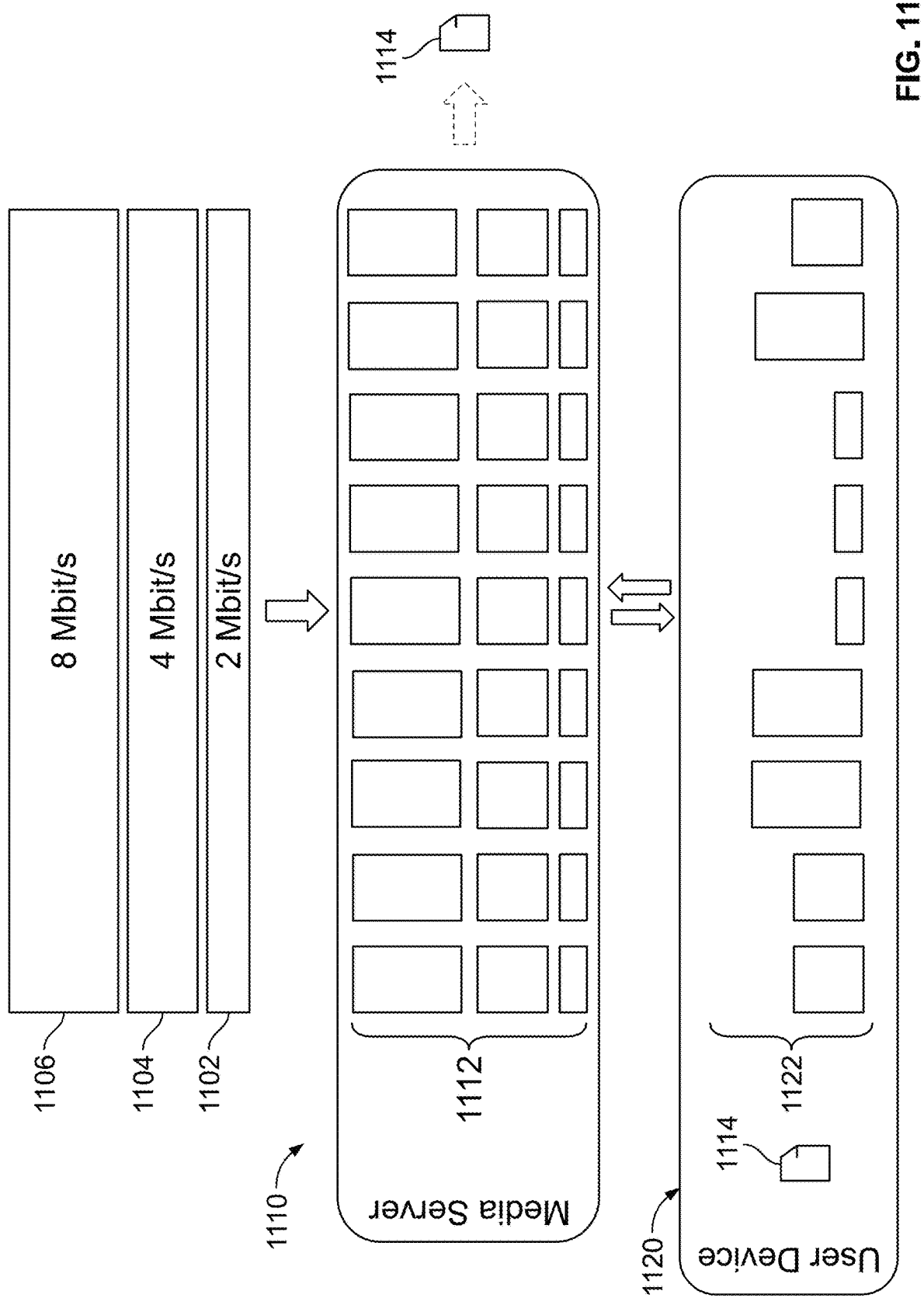
FIG. 11 is a pictorial representation of variable bitrate media content, in accordance with some examples of the disclosure.

FIG. 11 is a pictorial representation of variable bitrate media content, in accordance with some examples of the disclosure. A first bitrate variant 1102, a second bitrate variant 1104, and a third bitrate variant 1106 are shown as 2 Mbit/s (2 megabits per second), 4 Mbit/s, and 8 Mbit/s, respectively. However, it should be understood that any suitable value of bitrates may be used and there may be more or fewer bitrate variants available for any content. In addition, there may also be intermediate bitrate values (e.g., 1 Mbit/s or values greater than 8 Mbit/s).

In some examples, the Media Server 1110 separates the first bitrate variant 1102, second bitrate variant 1104, and third bitrate variant 1106 into a plurality of segments 1112. In some examples, the segment size is determined by the seconds of content to be consumed. However, in other examples, the segment size can be determined by a number of frames, the cache size of the user device, the length of a segment (in seconds), or the amount of data to be transmitted (i.e., a segment size limit). The plurality of segments 1112 are encoded with resolutions ranging from, for example, 360p to 2160p and various quality levels using adaptive bitrate streaming compatible codecs and resolutions for adaptive video streaming formats. In some examples, the lowest bitrate variants are text, hyperlinked text, or a still image. In some examples, the highest bitrate variants are large video formats and high-quality audio. In some examples, each of the bitrate variants is separated by a minimum delta megabit per second (Mbps), for example, 1 Mbps or 2 Mbps.

In some examples, a master playlist 1114 containing URLs to each of the plurality of segments 1112 is outputted and transmitted from the media server 1110 to the user device 1120 as a manifest that describes the available stream segments of an adaptive video stream and their respective bitrate variants to a user device 1120. Which bitrate variant the user device chooses can be changed from second to second or segment to segment. For example, if a user's available bandwidth changes, the user device 1120 can select a different bitrate variant (i.e., a different video quality) to match the available bandwidth.

In some examples, the media server 1110 may determine segments of interest for performing a scan, a plurality of segments of interest for performing a scan, or a number of frames of interest for performing a scan. Accordingly, in some examples, when the media server 1110 outputs the master playlist 1114, such as a manifest, the media server can create a scan tag, element, or attribute for each of the segments, scenes, media assets, or frames.

In some examples, the segments as described with reference to FIG. 11 are segments of a plurality of segments of an adaptive bitrate stream (e.g., MPEG-DASH, Adobe HTTP Dynamic Streaming, Apple HTTP Live Streaming, Microsoft Smooth Streaming, QuavStreams Adaptive Streaming over HTTP, upLynk, or the like).

Figure 12:
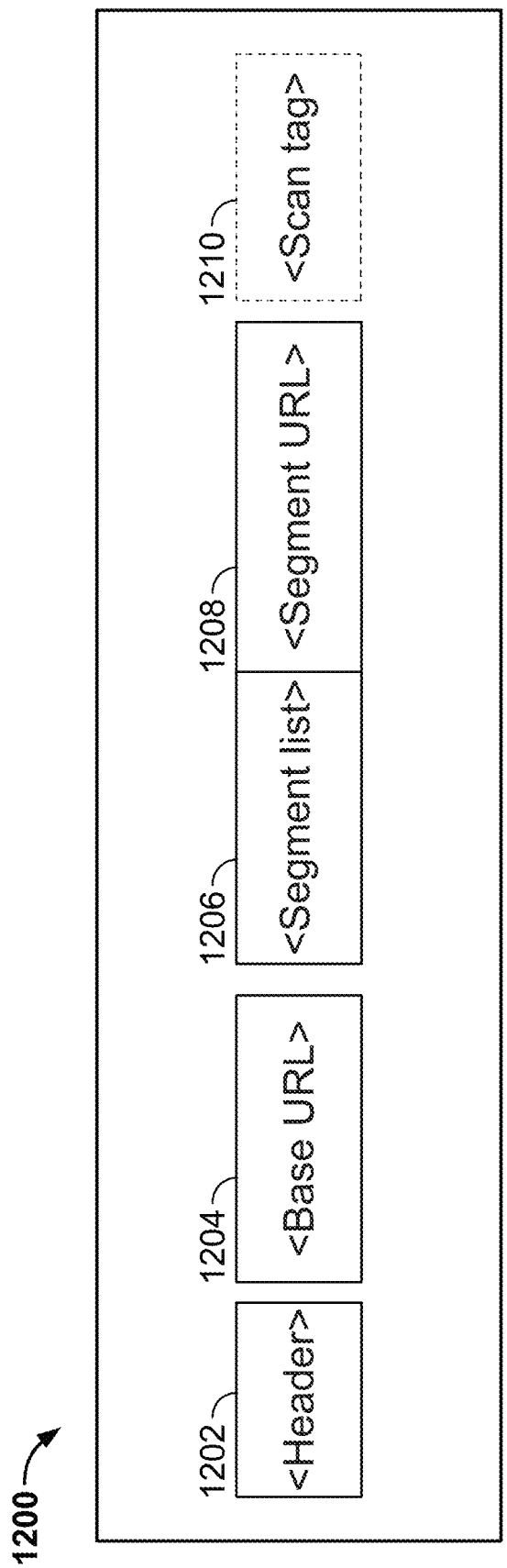
FIG. 12 is a pictorial representation of a manifest for adaptive bitrate content, in accordance with some examples of the disclosure.

FIG. 12 is a pictorial representation of a manifest for adaptive bitrate content, in accordance with some examples of the disclosure. In an exemplary manifest 1200, there is provided a header 1202, base URL 1204, segment list 1206, segment URL 1208, and in some examples, a scan tag, element, attribute—shown as a scan tag 1210 in FIG. 12.

The manifest 1200 is a container file for chunks of data that provide a user device with the information required for the user device to request a video or audio resource (e.g., media content or a media content item). As shown in FIG. 12, a manifest 1200 starts with a header 1202 and then contains a series of data blocks 1204 to 1210. In some examples, the header of the manifest identifies the format that the manifest is in (e.g., HTML, XML, or the like) and/or what adaptive bitrate technology the manifest relates to (e.g., DASH, HLS, or the like). In some examples, the header can be omitted from being present within manifest 1200 because the format of the manifest 1200 can be indicated by the filename extension suffix (e.g., ".xml," ".m3u8," ".txt," or the like), or a footer (not shown in FIG. 12, but included in the exemplary pseudo-code shown in FIG. 13A).

In some examples, the data blocks of a manifest may comprise a block indicating a base URL 1204, a segment list 1206, a segment URL 1208, and scan tag 1210. Other examples of data blocks include media type, representation blocks, ID tags, file names, initialization source, subtitles, and fallback sources (e.g., failover URLs).

In some examples, a data block may be a base URL 1204 for signaling the base URL that all resources to follow will be obtained from. For example, the base URL 1204 is the first part of a website URL such as "http://video.platform-.com/v1." It is this base URL that later-described segment URLs will be concatenated onto. Like any of the data blocks 1204 to 1210, the base URL 1204 may comprise any text or character with an equivalent Unicode Code Point. In some examples, base URL 1204 may be unique to the whole manifest that all subsequent URLs, such as segment URL 1208, are concatenated onto.

In some examples, a data block may be a segment list 1206. In some examples, segment list 1206 may further comprise a segment reference, for example, a range of frames to obtain (e.g., range="0-862"), a start and end time to obtain (e.g., 1253 s to 1258 s), or a segment reference ID (e.g., "segment 12"). In some examples, the segment list 1206 further comprises a bitrate variant reference ID or tag. In some examples, the segment list 1206 with a range of frames to obtain is referred to as a media range. In some examples, there may be a minimum duration that the segment list 1206 indicates. For example, a minimum duration of 10 seconds to obtain as a segment, although any period may be chosen as a minimum duration.

In some examples, a data block may be a segment URL 1208. As mentioned briefly above, segment URL 1208 is a suffix to be added to the base URL by the user device to complete the URL to a particular segment. In other words, base URL 1204 and segment URL 1208 together make the complete URL to any particular media content item contained within the manifest. In some examples, the whole URL per segment or bitrate variant is displayed in the segment list 1206; however, this is often unnecessarily clogging up the manifest with a lot of repetitive data. In the concatenating examples, the overall manifest file size is kept to a minimum, reducing unnecessary overheads in the manifest file.

The manifest 1200 may further comprise a data block that represents a scan tag 1210. In some examples, the scan tag 1210 is used to provide an indication to the media device to perform a scan for nearby user devices at a segment, plurality of segments, frames, or scenes of interest. The scan tag 1210 may be included in any one or more of the header 1202, base URL 1204, segment list 1206, or segment URL 1208, and may not be an isolated scan tag 1210 as suggested by FIG. 12. The scan tag 1210 may be an element that the logic of the media device can interpret. The scan tag 1210 may also be included in segment metadata, such as, for example, codecs, audio tag, video tag, version numbers, encoding information, bandwidth markers, resolution or size of media content, or file names. In some examples, the scan tag 1210 is configurable by the user or is configured by a user profile of the user, which can be accessed by the media device or provided by the media server. For example, a user profile linked to the user device may configure the scan tag to always perform a scan when a first media asset is generated for display.

In some examples, the data blocks 1204 to 1210 further comprise metadata. In some examples, scan tag 1210 may further comprise rules on waiting periods before initiating the scan, or performing a scan before a segment and after a segment or group of segments, and the like.

Subtitles are also considered to be metadata of the manifest 1200, and subtitles are often provided in a format known as Web Video Text Tracks (WebVTT), which is a World Wide Web Consortium (W3C) standard for displaying timed text in connection with the HTML5 <track> element. Other common caption formats include XML-based Timed Text Markup Language (TTML) and the "SubRip" file format. The timed text refers to the presentation of text media in synchrony with other media, such as audio and video. In some embodiments, the user profile of a user may provide an indication of the user's preference for subtitles or other metadata. In determining the presence of such a user, the media device can automatically turn on the subtitles to reflect the user's preference. In some examples, wherein the user with the preference for subtitles is not present, the subtitles will not be displayed; however, upon detecting the presence of the user devices associated with the user profile of the user with a preference for subtitles, the media device will switch on the subtitles.

Any data blocks 1202 to 1210 that are not understood by legacy media asset players, due to the fact they have not been updated to read such data blocks, would be ignored. Therefore, in some examples, the manifest 1200 is backward compatible with legacy user devices. Data blocks 1202 to 1210 may be separated by lines, commas, semi-colons, special characters, or any other common choices of the syntax used in computing languages such as C++, C#, Python, R, Java, JavaScript, HTML, and the like.

In some examples, the media device 114 can do an initial parse of the manifest 1200 to determine the presence of scan tag 1210.

FIG. 13 illustrates exemplary pseudo-code for an adaptive bitrate manifest, in accordance with some examples of the disclosure. FIG. 13 is considered to be an exemplary implementation of manifest 1200 as described above with reference to FIG. 12. FIG. 13 shows a manifest 1300. In manifest 1300 there is provided a header 1302, a base URL 1304, first scan tag 1310, a first segment list 1320, second scan tag 1330, a second segment list 1340, comprising first and second segment URLs 1342 and 1344, and a footer 1350.

The manifest 1300 is a container file, usually comprising lines of instructions to be carried out by a user device. The manifest 1300 may be generated by a media server in response to a request to deliver media content. In particular, manifest 1300 starts with a header 1302 comprising lines 0 and 1 of the pseudo-code. In this example, the header informs the user device of the version and encoding formats of the manifest 1300 and includes some reference sources for information. The user device may be a web browser, media player, application on a smartphone, or another device.

The manifest 1300 comprises a base URL 1304 in line 2. The base URL 1304 is "http://video.platform.com/v1" and is shown between two tags, indicating the base URL 1304 to the user device.

Lines 4 and 10 comprise first and second scan tags 1310 and 1330. The first scan tag 1310, shown on line 4 of FIG. 13, comprises a scan tag that indicates the following lines do not require a scan initiation. In this case, this is because lines 4 to 9 describe the audio information, however, this may also comprise a scan tag with a value that indicates a scan should be initiated, especially in scenarios when the media content is audio-only. The second scan tag 1330, shown on line 10, comprises a scan tag that indicates the following lines should initiate a scan. The media device can therefore identify the lines following the first and second scan tags 1310 and 1330 as such. In the example shown in FIG. 13, it should be understood that the values "0" and "1" are used as binary indicators to show that that the scan should or should not be performed in the referenced lines, which reference to audio and video segments. However, more complex indicators, tags, or values are considered to be included within the scope of this disclosure. For example, the scan tag may also comprise a start time and an end time for the scan, or a timer on when to begin the scan.

Manifest 1300 comprises a first segment list 1320. First segment list 1320 follows the first scan tag 1310 on line 4; therefore, the user device will understand that the first segment list 1320 is a segment list for audio. In particular, lines 5 to 9 of manifest 1300 provide the information required for the user device to obtain the audio contained within the base URL 1304. In some examples, the user device concatenates the base URL 1304 with the segment URL found within the first and second segment lists 1320 and 1340 to obtain the full URL where the media content item can be found.

Manifest 1300 comprises a second segment list 1340, comprising first and second segment URLs 1342 and 1344. The media content item that manifest 1300 comprises the URLs for the user device to obtain also comprises multiple bitrate variants. In particular, a bitrate variant is contained within the first segment URL 1342 requiring a bandwidth of 1 Mbit/s (megabits per second) that has a resolution of 2160×1440 pixels per square inch, as shown in FIG. 13 in the metadata of lines 11 to 14. A second bitrate variant is contained within the second segment URL 1342 requiring a bandwidth minimum of 2 Mbit/s that has a resolution of 3840×2160 pixels per square inch, as shown in FIG. 13 in the metadata of lines 15 to 17. The first and second segment URLs 1342 and 1344 point to a video titled "Joelsmixtape" encoded with advanced video coding (AVC) also referred to as H.264 or MPEG-4 Part 10, Advanced Video Coding (MPEG-4 AVC).

Manifest 1300 comprises a footer 1350. The footer indicates the end of the manifest 1300 and often comprises contextual information such as file extension suffixes (e.g., ".xml," ".m3u8," ".txt," or the like). Further information may also be included in the manifest 1300 files such as initialization sources, subtitles, fallback sources (e.g., failover URLs), or scan tags, elements, or attributes.

FIG. 14 illustrates an exemplary pseudo-code for result data of a scan to determine the number of viewers of a media device received at a media server, in accordance with some embodiments of the disclosure. FIG. 14 is considered to be an exemplary implementation of the aggregation of result data from a plurality of scans performed by one or more media devices to determine the number of viewers of a media device displaying a first media asset. FIG. 14 shows a text file 1400. In text file 1400 there is a first result data 1410, second result data 1420, and third result data 1430, each from a first media device 225A, second media device 225B, and third media device 225C, respectively, all of FIG. 2.

The result data comprises metadata. The metadata includes, but is not limited to, an indication of the number of devices in the vicinity of the media device; a program identification number, which indicates the program being watched on the media devices at the time of the scan; and a piece of temporal information, shown in FIG. 14 in Greenwich Mean Time (GMT).

The first result data 1410 is shown on lines 1-5. As can be seen on line 2, the number of devices in the vicinity of the first media device 225A is 4. The second result data 1420 is shown on lines 6-10. As can be seen on line 7, the number of devices in the vicinity of the first media device 225B is 1. The third result data 1430 is shown on lines 11-15. As can be seen on line 12, the number of devices in the vicinity of the first media device 225C is 1. This is corroborated by the illustration in FIG. 2.

Figure 15:
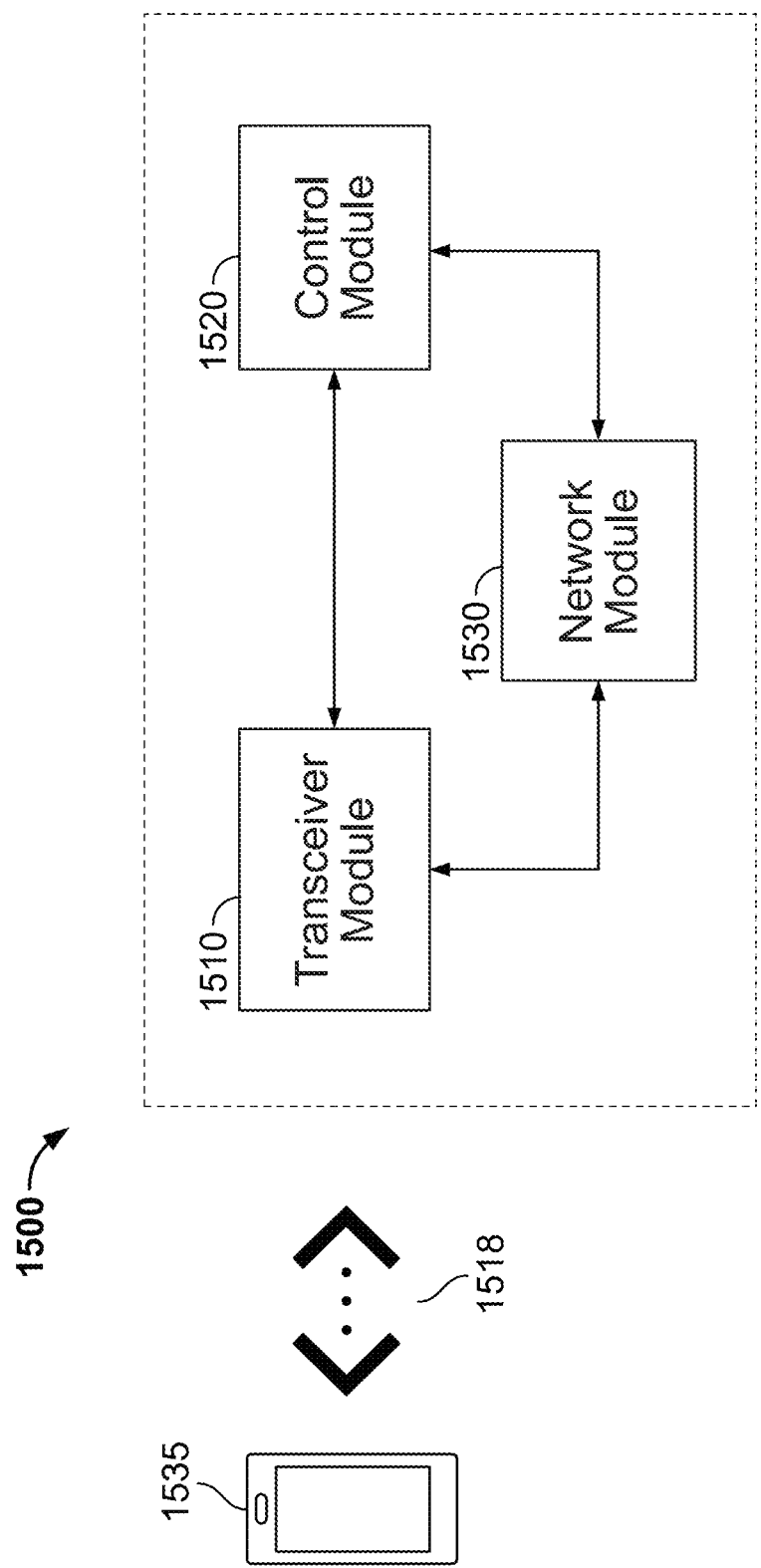
FIG. 15 illustrates an exemplary media transmission device, in accordance with some examples of the disclosure.

FIG. 15 illustrates an exemplary media transmission device, in accordance with some examples of the disclosure. The media transmission system 1500 comprises a transceiver module 1510, a control module 1520, and a network module 1530. The media transmission system may communicate with an additional user device 1535, such as a home game way, smartphone, smart watch, or other smart devices. In some examples, the transceiver module 1510 is configured to scan for nearby user devices within a detectable range of the media transmission system 1500, and optionally communicate with the additional user device 1535. The media content, media content item, or media asset may be stored on a media server 1602, as described with reference to FIG. 16.

In some examples, the control module 1520 is coupled to the transceiver module 1510 and the network module 1530. In some examples, the control module 1520 is adapted to generate for display on the media device a media asset, determine the number of nearby user devices, and determine a direction and distance from the media device to each of the user devices. Accordingly, the control module 1520 may determine, based on the distance and direction of the user devices, the number of viewers of the media device currently consuming the media asset. In addition, the control module enables a better viewing experience by maximizing the average available bandwidth to the user over a number of consecutive segments, maximizing the user viewing experience where possible. In some examples, the average may be determined over 2 or more segments. for example, 3 or 4 media content items. The control module can signal to the network module the media content items to download from the media server (such as server 1300).

In some examples, the network module 1530 is coupled with the transceiver module. In some examples, the network module 1530 is configured to request and/or retrieve a media asset from a media server, and optionally determine an available bandwidth of the media transmission device to request an appropriate media asset from the media server. For example, the network module may determine the available bandwidth of the media transmission device and report the same to the control module. In addition, the network module may initiate the scan, while the control module generates the media asset for display, after receiving a signal from a media server to initiate the scan.

In some examples, the transceiver module communicates with a media device 114 of FIG. 1, or a second user device 1535 via communication link 1518. The communication link 1518 between the transceiver module 1510 and the media device 114 or second user device 1535 may comprise a physical connection, facilitated by an input port such as a 3.5 mm jack, RCA jack, USB port, ethernet port, or any other suitable connection for communicating over a wired connection or may comprise a wireless connection via BLUETOOTH, Wi-Fi, WiMAX, Zigbee, GSM, UTMS, CDMA, TDMA, 3G, 4G, 4G LTE, 5G, or other wireless transmissions as described by the relevant 802.11 wireless communication protocols.

In some examples, the communication link 1518 is between the media transmission device 1500 and a home gateway device, which is in turn in communication with the second user device 1535. In some examples, the home gateway device may transmit a portion of a manifest 1200 or 13000 to the second user device 1535. For example, the second user device 1535 may receive just the base URL 904 and the segment URL 908 to make the GET request for the media content item. Each of the transceiver modules, the network module, and the control module may be separate internet of things (IoT) devices.

Figure 16:
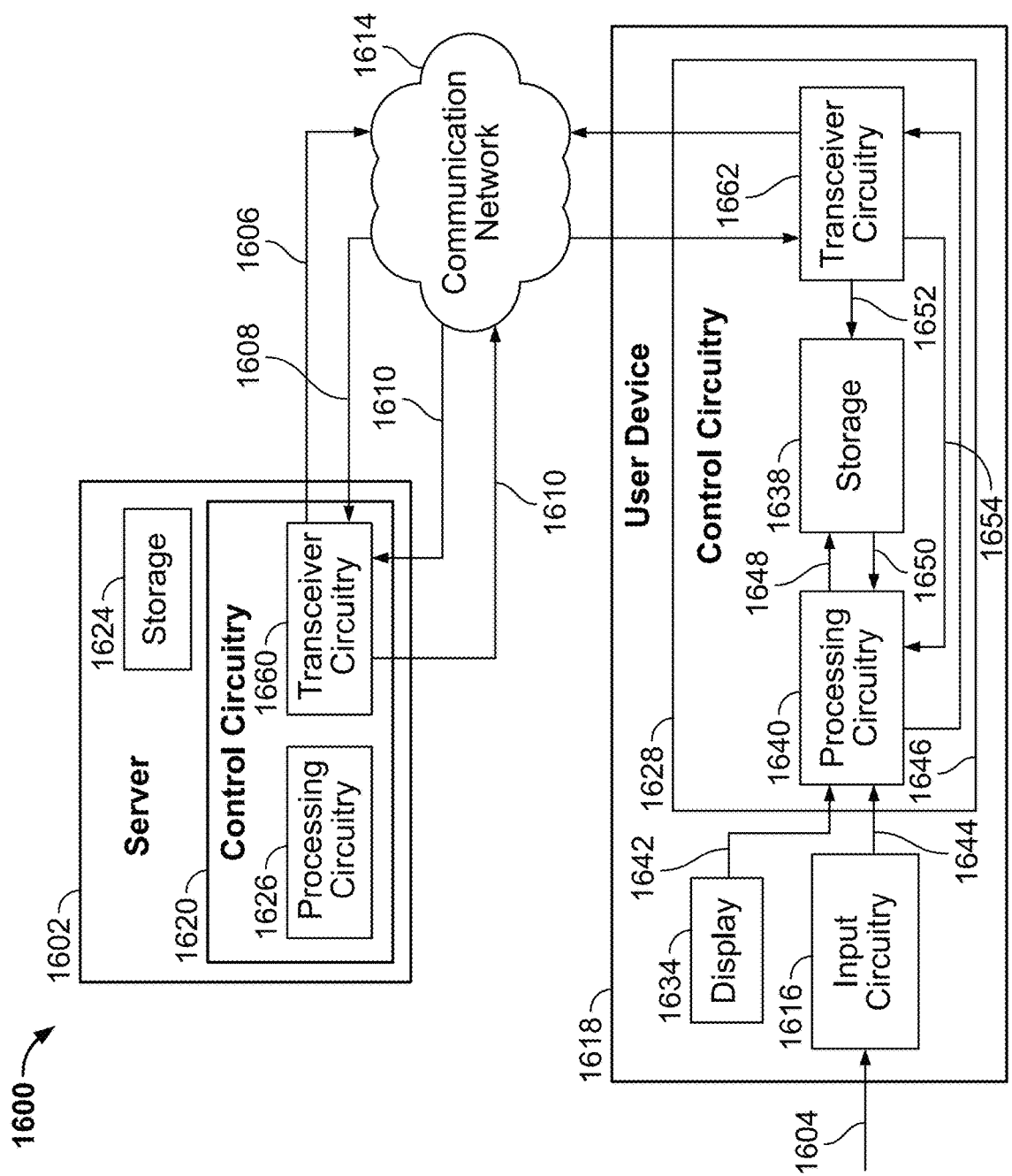
FIG. 16 is a block diagram representing devices, components of each device, and data flow therebetween for an adaptive video streaming system, in accordance with some examples of the disclosure.

FIG. 16 is a block diagram representing devices, components of each device, and data flow therebetween for an adaptive video streaming system, in accordance with some examples of the disclosure. System 1600 is shown to include a client device 1618, a server 1602, and a communication network 1614. It is understood that while a single instance of a component may be shown and described relative to FIG. 16, additional instances of the component may be employed. For example, server 1602 may include or may be incorporated in, more than one server. Similarly, communication network 1614 may include or may be incorporated in, more than one communication network. Server 1602 is shown communicatively coupled to client device 1618 through communication network 1614. While not shown in FIG. 16, server 1602 may be directly communicatively coupled to client device 1618, for example, in a system absent or bypassing communication network 1614.

In some examples, the request to stream the media content is made by a user device or a network device. For example, a user device or a network device (e.g., a laptop, PC, smartphone, smart TV, or the like) requests a media server to stream the media content.

In some examples, the media content is an adaptive bitrate stream compatible with the MPEG-DASH standard, or other implementations such as Apple HLS. In some examples, the first stream of media content is encoded at a first maximum bitrate and/or the first resolution. For example, the request may be a request for the next segment of an adaptive bitrate stream, and therefore the first stream of media content is at a first maximum bitrate (or resolution) based on the first network bandwidth. In some examples, the second stream of media content is encoded at a second maximum bitrate and/or a second resolution. For example, the request may be a request for the second segment of an adaptive bitrate stream, and therefore the second stream of media content is at a second maximum bitrate (or resolution) based on new current network bandwidth, different from the first network bandwidth. The second stream may be a higher bitrate than the first stream, or vice versa, depending on the network bandwidth at the current time of the request. Accordingly, in some examples, each of the alternative streams comprises a plurality of bitrate variants.

In some examples, the media content is encoded using an adaptive bitrate streaming compatible codec. There are numerous examples of video codecs that are adaptive bitrate streaming compatible (e.g., x264, OpenH264, H.264/MPEG-4 AVC, which are all codecs compatible with the video format H.264). Moreover, there are numerous examples of video formats (e.g., H.264, H.265, VP9, AV1), each of which has numerous examples of video codecs.

Communication network 1614 may comprise one or more network systems, such as, without limitation, an internet, LAN, WIFI, or other network systems suitable for audio processing applications. In some examples, system 1600 excludes server 1602, and functionality that would otherwise be implemented by server 1602 is instead implemented by other components of system 1600, such as one or more components of communication network 1614. In still other examples, server 1602 works in conjunction with one or more components of communication network 1614 to implement certain functionality described herein in a distributed or cooperative manner. Similarly, in some examples, system 1600 excludes client device 1618, and functionality that would otherwise be implemented by the client device 1618 is instead implemented by other components of system 1600, such as one or more components of the communication network 1614 or server 1602 or a combination. In still other examples, the client device 1618 works in conjunction with one or more components of communication network 1614 or server 1602 to implement certain functionality described herein in a distributed or cooperative manner.

The client device 1618 includes control circuitry 1628, display 1634, and input-output circuitry 1616. Control circuitry 1628, in turn, includes transceiver circuitry 1662, storage 1638, and processing circuitry 1640. In some examples, user device 1618 or control circuitry 1628 may be configured as user devices 102, 104, and 106 of FIG. 1.

Server 1602 includes control circuitry 1620 and storage 1624. Each of the storages 1624 and 1638 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 1624, 1638 may be used to store various types of content, media data, and or other types of data (e.g., they can be used to store media content such as audio, video, and advertisement data). The non-volatile memory may also be used (e.g., to launch a boot-up routine and other instructions). Cloud-based storage may be used to supplement storages 1624, 1638 or instead of storages 1624, 1638. In some examples, the pre-encoded or encoded media content, in accordance with the present disclosure, may be stored on one or more of storages 1624, 1638.

In some examples, control circuitry 1620 and/or 1628 executes instructions for an application stored on the memory (e.g., storage 1624 and/or storage 1638). Specifically, control circuitry 1620 and/or 1628 may be instructed by the application to perform the functions discussed herein. In some implementations, any action performed by control circuitry 1620 and/or 1628 may be based on instructions received from the application. For example, the application may be implemented as software or a set of executable instructions that may be stored on storage 1624 and/or 1638 and executed by control circuitry 1620 and/or 1628. In some examples, the application may be a client/server application where only a client application resides on client device 1618, and a server application resides on server 1602.

The application may be implemented using any suitable architecture. For example, it may be a stand-alone application wholly implemented on client device 1618. In such an approach, instructions for the application are stored locally (e.g., in storage 1638), and data for use by the application is downloaded periodically (e.g., from an out-of-band feed, from an internet resource, or using another suitable approach). Control circuitry 1628 may retrieve instructions for the application from storage 1638 and process the instructions to perform the functionality described herein. Based on the processed instructions, control circuitry 1628 may determine a type of action to perform in response to input received from the input/output path (or input-output circuitry) 1616 or the communication network 1614. For example, in response to a network bandwidth maximum, control circuitry 1628 may perform the steps of processes relative to various examples discussed herein.

In client/server-based examples, control circuitry 1628 may include communication circuitry suitable for communicating with an application server (e.g., server 1602) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 1614). In another example of a client/server-based application, control circuitry 1628 runs a web browser that interprets web pages provided by a remote server (e.g., server 1602). For example, the remote server may store the instructions for the application in a storage device. The remote server may process the stored instructions using circuitry (e.g., control circuitry 1628) and/or generate displays. Client device 1618 may receive the displays generated by the remote server and may display the content of the displays locally via display 1634. This way, the processing of the instructions is performed remotely (e.g., by server 1602) while the resulting displays, such as the display windows described elsewhere herein, are provided locally on the client device 1618. Client device 1618 may receive inputs from the user via input circuitry 1616 and transmit those inputs to the remote server for processing and generating the corresponding displays. Alternatively, client device 1618 may receive inputs from the user via input circuitry 1616 and process and display the received inputs locally, by control circuitry 1628 and display 1634, respectively.

Server 1602 and client device 1618 may transmit and receive content and data such as media content via communication network 1614. For example, server 1602 may be a media content provider, and client device 1618 may be a smart television configured to download or stream media content, such as a YouTube video, from server 1602. Control circuitry 1620, 1628 may send and receive commands, requests, and other suitable data through communication network 1614 using transceiver circuitry 1660, 1662, respectively. Control circuitry 1620, 1628 may communicate directly with each other using transceiver circuitry 1660, 1662, respectively, avoiding communication network 1614.

It is understood that client device 1618 is not limited to the examples and methods shown and described herein. In non-limiting examples, the client device 1618 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 1620 and/or 1618 may be based on any suitable processing circuitry such as processing circuitry 1626 and/or 1640, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor). In some examples, control circuitry 1620 and/or control circuitry 1618 are configured to implement a media content operation system, such as systems, or parts thereof, that perform various media content manipulation processes described herein.

Client device 1618 receives a user input 1604 at input circuitry 1616. For example, client device 1618 may receive a user input like a user swipe or user touch, as previously discussed. In some examples, client device 1618 is a media device (or player), with the capability to access media content. It is understood that client device 1618 is not limited to the examples and methods shown and described herein. In non-limiting examples, the client device 1618 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 1604 may be received from a user selection-capturing interface that is separate from device 1618, such as a remote-control device, trackpad, or any other suitable user movement sensitive or capture devices, or as part of device 1618, such as a touchscreen of display 1634. Transmission of user input 1604 to client device 1618 may be accomplished using a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, or any other suitable wireless transmission protocol. Input circuitry 1616 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, or other wireless transmission protocols.

Processing circuitry 1640 may receive input 1604 from input circuit 1616. Processing circuitry 1640 may convert or translate the received user input 1604 that may be in the form of gestures or movement to digital signals. In some examples, input circuit 1616 performs the translation to digital signals. In some examples, processing circuitry 1640 (or processing circuitry 1626, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing examples. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing examples, but also any examples which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing examples. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method comprising:
    generating for display on a media device a media asset;
    initiating a first scan, while the media asset is displayed, for nearby user devices within a detectable range;
    determining a plurality of nearby user devices located within a consuming area of the detectable range;
    determining a direction and a distance from the media device to each of the plurality of nearby user devices; and
    determining, based at least on the distance and the direction of each of the plurality of nearby user devices, a number of consumers present with the media device while the media asset is displayed.

2. The method of claim 1, wherein each of the plurality of nearby user devices has a line of sight to the media asset displayed on the media device while in the consuming area.

3. The method of claim 1, wherein users associated with each of the plurality of nearby user devices are able to consume the media asset while in the consuming area.

4. The method of claim 1, wherein the consuming area of the detectable range is determined based on user input.

5. The method of claim 1, further comprising:
    displaying, at a user device of the plurality of nearby user devices, a request to confirm that the user device is located within the consuming area; and
    receiving, at the user device, user input confirming that the user device is located within the consuming area.

6. The method of claim 1, further comprising:
    displaying, at a user device of the plurality of nearby user devices, a request to confirm that the user device is located within the consuming area; and
    receiving, at the user device, user input indicating that the user device is not located within the consuming area.

7. The method of claim 6, further comprising:
    displaying, at the user device, a prompt indicating that the user device is not located within the consuming area.

8. The method of claim 1, further comprising:
    generating for display on the media device a second media asset;
    initiating a second scan, while the second media asset is displayed;
    comparing first scan data and second scan data to:
        determine a change in the number of plurality of nearby user devices located within the consuming area of the detectable range; and/or
        determine if any of the user devices are non-viewer devices or static devices.

9. The method of claim 1, wherein the detectable range is based on at least one of:
    a signal comprising an indication of size of a display communicatively coupled with the media device;
    a user input; or
    determining an average distance from the media device to one or more the plurality of nearby user devices based on a received signal strength indication of the scanning signal at the user device.

10. The method of claim 1, wherein determining the direction and the distance is based on:
    an angle of arrival of a scanning signal at each of the user devices, and an angle of departure of the scanning signal at the media device; and
    a received signal strength indication of the scanning signal at the user device.

11. A system comprising:
    control circuitry configured to:
        generate for display on a media device a media asset;
        initiate a first scan, while the media asset is displayed, for nearby user devices within a detectable range;
        determine a plurality of nearby user devices located within a consuming area of the detectable range;
        determine a direction and a distance from the media device to each of the plurality of nearby user devices; and
        determine, based at least on the distance and the direction of each of the plurality of nearby user devices, a number of consumers present with the media device while the media asset is displayed.

12. The system of claim 11, wherein each of the plurality of nearby user devices has a line of sight to the media asset displayed on the media device while in the consuming area.

13. The system of claim 11, wherein users associated with each of the plurality of nearby user devices are able to consume the media asset while in the consuming area.

14. The system of claim 11, wherein the consuming area of the detectable range is determined based on user input.

15. The system of claim 11, wherein the control circuitry is further configured to:
display, at a user device of the plurality of nearby user devices, a request to confirm that the user device is located within the consuming area; and
receive, at the user device, user input confirming that the user device is located within the consuming area.

16. The system of claim 11, wherein the control circuitry is further configured to:
display, at a user device of the plurality of nearby user devices, a request to confirm that the user device is located within the consuming area; and
receive, at the user device, user input indicating that the user device is not located within the consuming area.

17. The system of claim 16, wherein the control circuitry is further configured to:
display, at the user device, a prompt indicating that the user device is not located within the consuming area.

18. The system of claim 11, wherein the control circuitry is further configured to:
generate for display on the media device a second media asset;
initiate a second scan, while displaying the second media asset;
compare first scan data and second scan data to:
determine a change in the number of consumers; and/or
determine if any of the plurality of nearby user devices are non-viewer devices or static devices.

19. The system of claim 11, wherein the detectable range is based on at least one of:
a signal comprising an indication of size of a display communicatively coupled with the media device;
a user input; or
determining an average distance from the media device to one or more of the plurality of nearby user devices based on a received signal strength indication of the scanning signal at the user device.

20. The system of claim 11, wherein determining the direction and the distance is based on:
an angle of arrival of a scanning signal at each of the plurality of nearby user devices, and an angle of departure of the scanning signal at the media device; and
a received signal strength indication of the scanning signal at the user device.

* * * * *